(12) United States Patent
Robinson et al.

(10) Patent No.: US 12,378,408 B2
(45) Date of Patent: Aug. 5, 2025

(54) PLASTICIZER LIGNIN COMPOSITIONS

(71) Applicant: Evoco Ltd., Toronto (CA)

(72) Inventors: Jason James Robinson, Toronto (CA);
Mustafa Abu Ghalia, Toronto (CA);
Radu Lucian Vicol, Toronto (CA);
Guerino G. Sacripante, Oakville (CA)

(73) Assignee: Evoco Ltd., Toronto (CA)

( * ) Notice: Subject to any disclaimer, the term of this patent is extended or adjusted under 35 U.S.C. 154(b) by 169 days.

(21) Appl. No.: 17/126,426

(22) Filed: Dec. 18, 2020

(65) Prior Publication Data

US 2022/0195182 A1    Jun. 23, 2022

(51) Int. Cl.
| | |
|---|---|
| *C08L 75/06* | (2006.01) |
| *C08G 18/42* | (2006.01) |
| *C08G 18/76* | (2006.01) |
| *C08K 5/00* | (2006.01) |
| *C08K 5/11* | (2006.01) |
| *C08L 97/00* | (2006.01) |

(52) U.S. Cl.
CPC .......... *C08L 75/06* (2013.01); *C08G 18/4261* (2013.01); *C08G 18/7671* (2013.01); *C08K 5/0025* (2013.01); *C08K 5/11* (2013.01); *C08L 97/005* (2013.01); *C08G 2110/0083* (2021.01)

(58) Field of Classification Search
CPC ... C08L 75/06; C08L 97/005; C08G 18/4261; C08G 18/7671; C08G 2110/0083; C08G 18/4081; C08G 18/6484; C08G 2110/0066; C08G 2410/00; C08G 18/3206; C08G 18/4238; C08G 18/664; C08G 18/797; C08K 5/0025; C08K 5/11
See application file for complete search history.

(56) References Cited

U.S. PATENT DOCUMENTS

| | | | |
|---|---|---|---|
| 2016/0145376 A1* | 5/2016 | Chen | ................ D01F 6/94 |
| | | | 264/211 |
| 2022/0259371 A1* | 8/2022 | Lakrout | ............. C08G 18/5021 |

FOREIGN PATENT DOCUMENTS

| | | | | |
|---|---|---|---|---|
| CA | 2918686 | | 2/2015 | |
| CA | 2932275 | | 6/2015 | |
| CN | 111100441 | A | 5/2020 | |
| CN | 112063138 | A | 12/2020 | |
| DE | 19545527 | A1 * | 6/1996 | ............. C08G 18/10 |

OTHER PUBLICATIONS

Wypych ("Handbook of Plasticizers", 2004) (Year: 2004).*
International Search Report and Written Opinion issued in respect of PCT/CA2021/051693, mailed Feb. 3, 2022.

* cited by examiner

*Primary Examiner* — Jiangtian Xu

(57) ABSTRACT

A polyurethane elastomer composition that contains (a) an organic diisocyanate, (b) a polyester resin, (c) a chain extender, (d) an optional crosslinker, (e) an optional colorant, (f) a surfactant, (g) a foaming agent, (h) an optional bio-additive, and a composition comprised of a plasticizer and a lignin.

20 Claims, No Drawings

PLASTICIZER LIGNIN COMPOSITIONS

This disclosure is generally directed to polyurethane elastomers generated from (a) an organic diisocyanate, (b) a polyester resin, (c) a chain extender, (d) a crosslinker, (e) a plasticizer lignin composition, optionally in the form of a dispersion, (f) a surfactant, (g) an optional blowing or foaming agent, (h) an optional bio-additive, (i) a catalyst, and (j) an optional colorant; and which foams can be selected for a number of articles, such as footwear, insoles, midsoles, shoes, boots, sneakers, slippers, clothing, insulation, automobile components, furniture components like coverings, bedding, seals, molded flexible parts, adhesives, automobiles, medical devices, and as a replacement for known polyurethane elastomers.

More specifically, in embodiments of the present disclosure there are utilized a plasticizer and a lignin composition, followed by removing the insoluble lignin by, for example, filtration, and selecting the remaining plasticizer and unfiltered lignin that includes solubilized lignin to generate polyurethane elastomers resulting in low color characteristics, improved viscosity and unique performance characteristics that permit the elastomers obtained use in, for example, insoles/midsoles.

RELATED APPLICATIONS

In copending U.S. application Ser. No. 17/015,669, electronically filed on Sep. 9, 2020 with the United States Patent Office, there are illustrated polyurethane elastomer compositions that can be, for example, selected for footwear, insoles, middle soles, and similar articles. The disclosure of this copending application is totally incorporated herein by reference.

In copending U.S. application Ser. No. 17/015,808, electronically filed on Sep. 9, 2020 with the United States Patent Office, there are illustrated bio-additive containing polyurethane elastomers, foam compositions, and processes thereof, the disclosure of this copending application being totally incorporated herein by reference.

In copending U.S. application Ser. No. 17/107,381, the disclosure of which is totally incorporated herein by reference, a continuation in part application of U.S. application Ser. No. 17/015,808, there are provided polyurethane elastomers generated from (a) an organic diisocyanate, (b) a polyester resin, (c) a chain extender, (d) a crosslinker, (e) a plasticizer, (f) a surfactant, (g) a number of bio-additives, (h) an optional blowing or foaming agent, and (i) an optional colorant; and which elastomers can be selected for a number of articles, such as footwear.

BACKGROUND

Illustrated in U.S. Pat. No. 10,604,616 is a polyurethane composite with a lignin dispersed in an aromatic polyisocyanate. By dispersing the lignin in the isocyanate resin, the lignin partially reacts with the isocyanate and is incorporated into its network.

Illustrated in U.S. Pat. No. 10,745,513 is a thermoset plastic prepared by thermosetting a flame-resistant lignin polyol blend, and where the flame-resistant lignin polyol blend further includes a flame retardant, that forms a complex with the lignin.

In U.S. Pat. No. 10,604,615, there is disclosed a rigid polyurethane foam which is the polymerization product of a composition including a concentrated acid, hydrolytic lignin, a polyol, and an isocyanate.

In U.S. Pat. No. 9,598,529 there is disclosed a process for the production of lignin based polyurethane products, where at least one dried lignin and one dried isocyanate are mixed to form a lignin-isocyanate mixture; the mixture is then heated and mixed with at least one polyol and at least one catalyst.

Disclosed in U.S. Pat. No. 10,087,298, and according to the abstract thereof, there is disclosed a bio-polyol composition and a bio-polyurethane foam material. With a modifier and a dispersing and grinding process, there is formed a modified lignin uniformly dispersed in the polyol solution.

Disclosed in U.S. Pat. No. 10,196,478 is composition dispersion that includes one or more dispersants, and an alkoxylated lignin where the dispersant includes, for example, a polyol diethylene glycol, tetraethylene glycol, and mixtures thereof, and a neutralized catalyst.

In U.S. Pat. No. 8,053,566 there is disclosed a method for isolating a lignin from a plant material by contacting the plant material with an aqueous ethanol solution at an elevated temperature, and an elevated pressure for a retention time sufficient to produce a liquid solvent mixture of ethanol, ethanol-soluble lignin and water, and a plant pulp material; separating the plant pulp material from the liquid solvent mixture; precipitating the ethanol-soluble lignin and forming lignin particulates by diluting the liquid solvent mixture with an aqueous gasified solution containing dissolved gas under conditions that promote the formation of gas bubbles, whereby the gas bubbles attach to the precipitated lignin particulates as they form, and the precipitated lignin particulates are transported to the liquid surface by attachment to the gas bubbles; harvesting the precipitated lignin from the liquid surface; and recovering an isolated lignin component from the precipitated lignin.

Illustrated in U.S. Pat. No. 10,563,005 is a process for the preparation of aromatic polyester polyols containing lignin as a major reactant.

Effective functionality of lignin is an area of focus in, for example, U.S. Pat. Nos. 9,598,529; 4,292,214; 10,087,298, and 10,323,115 where the lignin functionality can be obtained by mixing isocyanate and lignin, addition into a polyol, by mixing a lignin with a polyol prior to isocyanate injection, or through a copolymer forming polyol. However, the resulting products that include the lignin can have a number of disadvantages such as having a high color appearance.

Also, certain polyurethane flexible foams (PU) are known for their uses as footwear, automotive applications, Yoga mats, mattresses, and the like. However, conventional petrochemical based materials being used to manufacture polyurethane (PU) flexible foams usually have a negative impact on the environment. Thus, the increase in environmental consciousness has necessitated a demand for "greener" materials that could be partially addressed by using renewable materials in the production of PU foams. While increasing renewable content, it is also desired to maintain or improve the performance properties of the foam. Often, when introducing bio-based additives into foam formulations, there is a reduction in mechanical properties as these additives disrupt the foam network responsible for the mechanical strength. For example, in the footwear industry, mechanical strength properties, such as tensile strength, ultimate elongation, tear strength, and resilience, can be important to a foam's performance.

Footwear, like athletic shoes, whether for running or engaging in sports activities, lose massive amounts of energy due to impact and shock, especially in the midsoles. A well cushioned shoe disperses the impact and shock that, for a period of time, keeps the feet comfortable and prevents the feet from hurting. High performance athletic shoes have well cushioned midsoles that transfer the impact into forward motion or lift-offspring-like effect, as if the impact/shock is being turned into a return energy.

Numerous polyurethane elastomers are known, many of which possess deficiencies, such as insufficient life times, a number of unsatisfactory color characteristics, poor hardness, low resilience, degradation, unsuitable and inconsistent properties like tensile strengths, tear strengths, unsightly discoloration, complex and costly preparation procedures including the absence of components, such as phosphites, and the absence of polyesters like the disclosed amorphous polyester resins and semi-crystalline polyester resins in combination with other components.

Consequently, there is a need for compositions and processes that enable flexible polyurethane elastomer foams for the achievement of enhanced characteristics, and that are suitable for footwear insoles or midsoles that have, for example, specific mechanical properties, such as a hardness of the polyurethane foams of, for example, about 15 to about 60 Asker C, and more specifically, for insoles a hardness of, for example, about 22 to about 44 Asker C, and for midsoles a hardness of, for example, about 40 to about 60 Asker C, and with, for example, an amorphous polyester or a semi-crystalline polyester with excellent melting points, and which foams have a clear color, that is, for example, low color characteristics. Because lignins usually have poor solubility in polyurethanes, they are typically incorporated as particles or directly into the polyol or polyisocyanate as illustrated in the prior art. Also, unfortunately, all lignin components are believed to be highly colored and have a brown to black appearance, and thus are not that useful for flexible foam applications wherein low color is desired.

Also, there is a need for compositions and processes for flexible polyurethane elastomer foams with improved characteristics, and that includes as a component a bio-based polyol polyester, an amorphous polyester, or a semi-crystalline polyester with an excellent melting point.

Yet also, there is a need for polyurethane elastomer foams comprising surfactants, plasticizers, dyes, crosslinkers, chain extenders, and at least one soluble lignin extract.

Further, there is a need for polyurethane (PU foams) that has excellent density, consistent Asker C hardness, improved tensile strengths, consistent elongation, and high tear strength properties; and foams which are, for example, selected for shoes and similar footwear including insoles and midsoles.

Another need resides in the generation of polyurethane elastomers where the polyol melting point is decreased by reducing the number of semi-crystalline polyester polyols with a melting point above 50° C. prior to the foaming reaction. These high melting point polyols lead to an undesirable viscous liquid that causes difficulty of use in manufacturing methods as elevated temperatures result in less control over the reaction thereby adversely affecting product quality.

Additionally, there is a need for avoiding using plasticizers to lower the viscosities of polyols as it leads to negative effects on the mechanical properties of the final foam materials.

There is also a need for compositions containing lignin for athletic shoes to receive and release high energy upon impact on striking a surface, thereby having superior energy return in addition to a resilience, which is the ability to spring back into its original shape (elasticity) after being compressed (measured by the rebound percentage). Athletic shoes lose massive amounts of energy due to shock impact, especially in areas around the midsole. A well cushioned shoe helps disperse this shock impact energy effectively, thereby keeping the feet comfortable and preventing them from hurting. The disclosed polyurethane foam-based midsoles have a number of desired characteristics, such as for example, a return energy of from about 50 percent to about 100 percent, from about 55 to about 75 percent, and from about 55 to about 65 percent as measured by VF Corporation with their proprietary equipment, hydrolytic stability, excellent resilience of, for example, from about 25 percent to about 60 percent, from about 30 percent to about 60 percent, from about 25 percent to about 45 percent, and improved compression sets.

Yet further, there is also a need for including certain bio-based additives like the disclosed lignin compositions into polyurethane elastomer foams to maintain and improve their performance, whereby adding these additives will not adversely affect the resulting foam properties. Lignin, which is, for example, a polyol biopolymer, can be obtained through food-grade and non-food grade biomasses, including agricultural waste or biomass from forests or plants thereof.

Furthermore, there is a need to reduce elastomer additive costs by replacing synthetic fillers, such as glass fiber, carbon fiber, and other microplastics with the disclosed lignin compositions, a complex, high molecular weight polymer that occurs naturally in plant materials, and is one of the most abundant renewable raw materials available. Moreover, large quantities of lignin are produced as byproducts of the pulp and paper industry.

Yet further, there is a need to enhance lignin reactivity, as despite the unique and desirable characteristics of lignin as a natural product with multiple beneficial chemicals, physical and biological properties, and abundance in nature, lignin isolated from plant materials remains largely underexploited resulting in limited industrial utilization.

Further, there is a need for polyurethane elastomers selected for insoles and midsoles with excellent mechanical properties, and where the insoles have in embodiments a density (gram/centimeters$^3$) of, for example, from about 0.2 to about 0.3; a hardness (Asker C) of, for example, from about 15 to about 45; an elongation of from about 450 percent to about 650 percent; a tensile strength of greater than about 20 MPa; a tear strength of equal to or greater than about 2 Newtons/millimeters; a rebound test resilience of from about 40 to about 55 percent; a compression set of less than about 6 percent; and a hydrolytic stability of equal to at least 80 percent; and for midsoles a density in gram/centimeter$^3$ of less than about 0.5; a hardness (Asker C) of from about 30 to about 50; an elongation of equal to or greater than about 300 percent; a tensile strength in MPa of greater than about 10; a tear strength in Newtons/millimeters of greater than about 3; a rebound test resilience of greater than about 60; a compression set of less than about 20 percent; an abrasion of less than about 300 percent; and a hydrolytic stability of at least 80 percent, and that are clear in color or white in color.

Yet further, there is a need for compositions and processes enabling flexible polyurethane elastomer foams with improved characteristics, and that are suitable for footwear insoles or midsoles and with, for example, specific mechanical properties, such as a hardness of the polyurethane foams of, for example, from about 15 to about 60 Asker C, and more specifically, for insoles a hardness of, for example, from about 22 to about 44 Asker C, and for midsoles a hardness of, for example from about 40 to about 60 Asker C, and with, for example, an amorphous polyester or a semi-crystalline polyester with excellent melting points Also, there is a need for compositions and processes for flexible polyurethane elastomer foams with improved characteristics, and that include as a component a polyol polyester, an amorphous polyester, or a semi-crystalline polyester with an excellent melting point and a lignin containing composition.

Yet also, there is a need for polyurethane elastomer foam processes wherein there are selected surfactants, plasticizers, dyes, crosslinkers, chain extenders, and at least one lignin containing composition or a lignin extract.

Further, there is a need for polyurethane (PU foams) that has an excellent density, prolonged Asker C hardness, improved tensile strengths, acceptable and consistent elongation, and tear strength properties, and which foams are, for example, selected for shoes and similar footwear that contain insoles and midsoles.

Another need resides in the generation of polyurethane elastomers where there is eliminated a number of semi-crystalline polyester polyols that are heated above 50° C. prior to permitting the initiation of foaming, and which polyols increase preheating time, create a highly viscous liquid with difficulty to use in manufacturing methods, and where elevated temperatures increase the reaction kinetics, and cause less control over the reaction thereby adversely affecting product quality.

Additionally, there is a need for where plasticizers to lower viscosities of a polyol, which negatively affects the mechanical properties of the final foam materials, is avoided.

There is a need for footwear like athletic shoes with superior energy return, that is the ability of footwear, such as athletic shoes, to receive and release energy upon impact on striking the ground versus resilience, which is the ability to spring back into its original shape (elasticity) after being compressed and measured by the rebound percentage.

Moreover, there is a specific need for lignin containing athletic shoes and for cushioned shoes that disperse the impact and shock that causes very comfortable feet and prevents or minimizes feet hurting by transferring the impact into forward motion or lift-offspring-like effect, that is the impact/shock is converted into a return energy versus losing massive amounts of energy due to impact and shock, especially in the midsoles.

There is a need for athletic shoes with superior energy return, that is the ability of footwear, such as athletic shoes, to receive and release energy upon impact on striking the ground versus resilience, which is the ability to spring back into its original shape (elasticity) after being compressed and measured by the rebound percentage. Athletic shoes, whether for running or engaging in sports activities, lose massive amounts of energy due to impact and shock, especially in the midsoles. A well cushioned shoe disperses the impact and shock that keeps the feet comfortable and prevents the feet from hurting. High performance athletic shoes have well cushioned midsoles that transfer the impact into forward motion or lift-offspring-like effect, as if the impact/shock is being turned into a return energy. The disclosed polyurethane foam-based midsoles have a number of desired characteristics, such as for example, a return energy of from about 50 percent to about 100 percent, from about 55 to about 75 percent, and from about 55 to about 65 percent as measured by VF Corporation with their proprietary equipment, hydrolytic stability, excellent resilience of, for example, from about 25 percent to about 60 percent, from about 30 percent to about 60 percent, from about 25 percent to about 45 percent, and improved compression sets.

Yet further, there is a need for including certain bio-based lignin containing composition additives in polyurethane elastomer foams that maintain and improve the performance of the foams, and where adding additional amounts of additives will not adversely affect the foam properties.

Another need resides in generating polyurethane flexible foams that include bio-based lignin containing compositions for enhancing or modifying the mechanical properties of the foams while simultaneously increasing the bio-content thereof.

An important need resides in providing polyurethane elastomer foams with a bio-content of, for example, from about 50 percent to about 90 percent, from about 40 percent to 80 percent, from about 70 percent to about 85 percent, and from about 60 percent to about 80 percent.

These and other needs can be achievable with the lignin containing compositions polyurethane foams of the present disclosure.

SUMMARY

Disclosed is a polyurethane elastomer composition comprising (a) an organic diisocyanate, (b) a polyester resin, (c) a chain extender, (d) an optional crosslinker, (e) an optional colorant, (f) a surfactant, (g) a foaming agent, (h) an optional bio-additive, and (i) a composition comprised of a lignin and a plasticizer.

Also, disclosed is a polyurethane elastomer wherein insoluble lignin is removed from a lignin and plasticizer composition, and there is isolated the remaining plasticizer and soluble lignin, and wherein the composition is generated by the mixing of lignin and plasticizer, and there results a plasticizer and a soluble lignin present in an amount of from about 0.1 percent by weight to about 50 percent by weight.

Further, disclosed is a process for the preparation of a polyurethane elastomer comprising mixing (a) an organic diisocyanate, (b) a polyester resin, (c) a chain extender, (d) an optional crosslinker, (e) a plasticizer, (f) a surfactant, (g) a foaming agent, (i) a colorant, and an optional catalyst; and adding thereto a composition comprised of a plasticizer and a soluble lignin generated by forming a dispersion of said lignin and said plasticizer, removing the bulk unextracted insoluble lignin, and isolating the filtrate containing said plasticizer and a soluble lignin.

There is disclosed herein a polyurethane elastomer composition comprising (a) an organic diisocyanate, (b) a polyester resin, (c) a chain extender, (d) a crosslinker, (e) a plasticizer, and in contact with the plasticizer a lignin, (f) a surfactant, (g) a foaming agent, (h) optionally a bio-additive, and where the lignin extract is comprised of a mixture of a plasticizer and a soluble lignin, which can then be added to the polyurethane elastomer components.

Also, disclosed is a polyurethane elastomer composition comprising (a) an organic diisocyanate, (b) a semicrystalline or amorphous polyester resin, (c) a chain extender, (d) a crosslinker, (e) a plasticizer, (f) a surfactant, (g) a foaming agent, (h) a lignin extract comprised of a mixture of a plasticizer and a soluble lignin, and (i) an optional colorant, and a catalyst.

Disclosed herein are polyurethane elastomer compositions, which in embodiments are comprised of and can be generated from the mixing and reacting of the appropriate components of (a) an organic diisocyanate, (b) a polyester resin, (c) a chain extender comprised of a polyhydric alcohol, (d) a crosslinker, (e) a plasticizer, (f) a surfactant, (g) a lignin extract, (h) a foaming agent, and (i) an optional colorant, such as a dye, and a catalyst; and wherein the elastomers and foams thereof have, for example, a hardness value of from about 15 or 20 Asker C to about 60 Asker C, a tensile strength of, for example, from about 1 MPa to about 10 MPa, a resilience of, for example, from about 25 percent to about 60 percent, and an elongation at break of, for example, from about 150 percent to about 700 percent, and a tear strength of, for example, from about 2 Newtons/millimeters to about 4 Newtons/millimeters.

Also, disclosed is an article comprised of a polyurethane elastomer and foams thereof comprised of (a) an organic diisocyanate, (b) a polyester resin, (c) a chain extender comprised of a polyhydric alcohol, (d) an optional crosslinker, (e) a plasticizer, (f) a surfactant, (g) a foaming or blowing agent, (h) a lignin extract, or lignin containing compositions, and (i) a colorant like a pigment or a dye; and wherein the elastomer foam has a hardness value of from about 20 Asker C to about 60 Asker C, a tensile strength of from about 1 MPa to about 10 MPa, a resilience of from about 30 percent to about 60 percent, an elongation at break of from about 150 percent to about 700 percent, and a tear strength of from about 2 Newtons/millimeters to about 4 Newtons/millimeters.

Moreover, disclosed is a process for the preparation of a polyurethane elastomer and foams thereof comprising mixing (a) an organic diisocyanate, (b) a polyester resin derived from an organic diacid and organic diol, (c) a chain extender comprised of a polyhydric alcohol, (d) an optional crosslinker, (e) a plasticizer, (f) a surfactant, (g) at least one lignin containing composition, (h) a foaming agent, (i) a colorant such as a pigment or a dye, and (j) a catalyst; and wherein the elastomer has a hardness of from about 40 to about 60 Asker C, a tear strength of from about 2 to about 4 Newtons/millimeters, a resilience of from about 25 percent to about 45 percent, and a compression set of from about 3 percent to about 6 percent.

Yet additionally, there is disclosed a polyurethane elastomer and foams thereof prepared by the reaction of an organic diisocyanate, an amorphous polyester resin, or a semi-crystalline polyester resin with a melting point of equal to or less than about 50° C., a chain extender comprised of a polyhydric alcohol, a crosslinker, a plasticizer, a dye, a surfactant, a catalyst, a lignin extract, and a foaming or blowing agent.

Further, in embodiments there is disclosed a polyurethane elastomer foam composition, and processes thereof, and more specifically, a polyurethane elastomer foam composition that can be selected for the uses disclosed herein including for footwear, such as shoe articles comprised of an insole, a midsole, or both the insole and midsole. More specifically, there is disclosed a polyurethane elastomer foam derived from (a) an organic diisocyanate, (b) a semi-crystalline polyester resin derived from an organic diacid and organic diol, where the crystalline polyester resin has a melting point of less than about 65° C., from about 40° C. to about 50° C., from about 45° C. to about 49° C., and from about 5° C. to about 35° C., (c) a chain extender comprised of a polyhydric alcohol, (d) a crosslinker, (e) a plasticizer, (f) a surfactant, (g) a lignin containing composition or a lignin extract, (h) a foaming component, such as water, and wherein the elastomer has, for example, a hardness of from about 30 to about 60 Asker C, tensile strength of from about 1 to about 5 MPa, and an elongation at break of from about 250 percent to about 625 percent.

Furthermore, there are disclosed amorphous polyester polyols with melting points of equal to or less than about 5° C. to equal to or less than about 25° C., and more specifically, an amorphous polyester resin with no or zero melting point, and a glass transition temperature of less than about −10° C. like from about −2° C. to about −8° C. Also, determined, for example, by known techniques like Gel Permeation Chromatography (GPC), other desirable properties for the amorphous polyesters include weight average molecular weights of from about 700 Daltons to about 4,000 Daltons, hydroxyl values of from about 35 to about 65, and an acid number of less than about 5 milligrams/gram of KOH, and more specifically, from about 0.5 to about 1 milligram/gram of KOH. These polyols are subsequently used, for example, to prepare the disclosed polyurethane foams for the footwear industry and the automobile industry.

There is also disclosed a polyurethane elastomer foam composition comprised of from about 40 to about 55 percent by weight of a polyol polyester, from about 1 to about 3 percent by weight of a chain extender, from about 1 to about 7 percent by weight of a crosslinker, from about 8 to about 15 percent by weight of a plasticizer, from about 0.2 to about 0.5 percent by weight of a surfactant, from about 0.5 percent by weight to about 3 percent by weight of a chain extender, from about 0.1 percent by weight to about 0.5 percent by weight of a catalyst, from about 1 percent by weight to about 5 percent by weight of a lignin containing composition or soluble lignin extract, from about 0.1 percent by weight to about 3 percent by weight of foaming agent, from about 0.5 percent by weight to about 5 percent by weight of dye, and with from about 10 percent by weight to about 25 percent by weight of an organic diisocyanate, where all the percents by weight disclosed are equal to 100 percent by weight.

Moreover, there are disclosed processes for the preparation of a polyurethane elastomer foams comprised of contacting a homogenized mixture of from about 40 to about 60 percent by weight or parts of a polyester polyol, from about 8 percent by weight to about 20 percent by weight of a plasticizer, from about 0.5 percent by weight to about 1 percent by weight of surfactant, from about 0.5 to about 2 percent by weight of a chain extender, from about 0.1 percent by weight to about 5 percent by weight of a lignin extract, or lignin composition, from about 0.1 percent by weight to about 0.6 percent by weight of an optional catalyst, from about 0.1 percent by weight to about 5 percent by weight of a foaming agent of water, from about 0.1 percent by weight to about 5 percent by weight of crosslinker, from about 0.3 percent by weight to about 5 percent by weight of dye, and with from about 10 percent by weight to about 25 percent by weight of an organic diisocyanate, where all the percents by weight disclosed are equal to 100 percent by weight.

In addition, the following disclosures are provided:

The disclosed polyurethane elastomer compositions can be prepared from (i) a first mixture comprised of an amorphous or semi-crystalline polyester polyol resin, plasticizer, surfactant, chain extender, crosslinker, catalyst, water, lignin or lignin extract, and colorant; and contacting this mixture with a diisocyanate.

In one production process embodiment, the disclosed polyurethane elastomers can be prepared using a multistage process comprising where A) one or more substantially linear polyester diols with functionality of from about 1.8 to about 2.2 are reacted with a portion 1, such as one part of an organic diisocyanate or of the plurality of organic diisocyanatos in a molar NCO/OH ratio of from 1.1:1 to 3.5:1, and from about 1.3:1 to about 2.5:1 to provide a relatively high molecular weight isocyanate-terminated prepolymer ("NCO prepolymer"); B) the prepolymer obtained in stage A) is blended with a portion 2 of the organic diisocyanate or the plurality of organic diisocyanatos where the entirety of portion 1 and portion 2 corresponds to the entire amount of diisocyanatos used; C) the mixture obtained in stage B) is reacted with one or more diol chain extenders with, for example, weight average molecular weights, as determined by GPC, of from about 60 to about 350, where the molar NCO:OH ratio resulting from the components used in A), B), and C) is at from about 0.9:1 to about 1.1:1, and where the substantially linear polyester diols A) are comprised of succinic acid and 1,3-propanediol, and have an optional average molar mass of from about 750 to about 3,500 gram/mol. Thereafter, there can be added thereto the lignin containing composition or lignin extract, and other components disclosed herein.

In embodiments, the disclosed polyurethane elastomers, which in embodiments are biodegradable, can be derived from the reaction of a polyester polyol of from about 45 to about 55 percent by weight, a chain extender of from about 0.1 to about 2 percent by weight, a crosslinker of from about 1 to about 5 percent by weight, a foaming agent of from about 0.1 to about 2 percent by weight, a diisocyanate of from about 40 to about 55 percent by weight, a surfactant of from about 1 to about 5 percent by weight, followed by the addition of a composite comprised of plasticizer and a lignin dispersion, such as a plasticizer and solubilized lignin of the amounts illustrated herein, and wherein the total thereof of all components is 100 percent.

According to another disclosed embodiment there is provided lignin dispersed in a plasticizer, wherein a portion of the lignin is extracted into the plasticizer, followed by filtering off the unextracted lignin. The resulting filtrate comprised of the plasticizer and soluble lignin extract is then utilized for the preparation of the polyurethane foam. One advantage of using the extract is that the resulting color of the polyurethane foam is improved.

Further, disclosed is a process for the preparation of a polyurethane elastomer comprising mixing (a) an organic diisocyanate, (b) a polyester resin, (c) a chain extender, (d) an optional crosslinker, (e) a surfactant, (f) a foaming agent, and (g) a colorant; followed by mixing said (a), (b), (c), (d), (e), (f) and (g), and a composition comprised of a plasticizer and a soluble lignin generated by forming a dispersion of said lignin and said plasticizer, removing the bulk unextracted insoluble lignin, and isolating the filtrate containing said plasticizer and said soluble lignin.

Disclosed also is a process for the preparation of a polyurethane elastomer comprising mixing a catalyst with (a) an organic diisocyanate, (b) a polyester resin, (c) a chain extender, (d) an optional crosslinker, (e) a surfactant, (f) a foaming agent, and (g) a colorant; followed by mixing said catalyst and (a), (b), (c), (d) when present, (e), (f) and (g), and a composition comprised of a plasticizer and a soluble lignin generated by forming a mixture of said lignin and said plasticizer, removing the bulk unextracted insoluble lignin, and isolating the filtrate containing said plasticizer and said soluble lignin.

The disclosed amorphous or semi-crystalline polyester polyol resins can be prepared by a polycondensation process by reacting suitable organic diols and suitable organic diacids in the presence of polycondensation catalysts. Generally, a stoichiometric equimolar ratio of organic diol and organic diacid is utilized, however, ideally, an excess of organic diol is utilized such that the resulting polymer displays a hydroxyl number of from about 30 to about 40, an acid number of equal to or less than about 5 milligrams/gram of KOH, and equal to or less than 1 milligram/gram of KOH at a molecular weight of from about 1,500 to about 5,000 Daltons. In some instances, wherein the boiling point of the organic diol is, for example, from about 180° C. to about 230° C. (degrees Centigrade throughout), an excess amount of diol, such as ethylene glycol or propylene glycol, of from about 0.2 to 1 mole equivalent, can be utilized and removed during the polycondensation process by distillation. The amount of catalyst utilized varies, and can be selected in amounts as disclosed herein, and more specifically, for example, from about 0.01 to about 1, or from about 0.1 to about 0.75 mole percent of the crystalline polyester resin.

Yet, there is disclosed a polyurethane elastomer composition comprising (a) an organic diisocyanate, (b) a polyester resin, (c) a chain extender, (d) a crosslinker, (e) an optional colorant, (f) a surfactant, (g) a foaming agent, (h) an optional bio-additive, and (i) a composition comprised of a mixture of a plasticizer and a lignin; a polyurethane elastomer composition comprising (a) an organic diisocyanate, (b) a semicrystalline polyester resin, (c) a chain extender, (d) a crosslinker, (e) an optional colorant, (f) a surfactant, (g) a foaming agent, a catalyst, and a plasticizer, and a soluble lignin in substantially permanent contact with said plasticizer. The lignin is rendered in contact with a plasticizer by heating at a temperature of from about 25° C. to about 90° C., then extraction of the lignin soluble portion, and optionally the insoluble portion of lignin which can be removed by filtration and discarded. The word contact is well known and in the context of the present disclosure contact refers, for example, to surfaces of the plasticizer and lignin meet and are in touch with each other.

Additionally, disclosed is an article of manufacture comprising a polyurethane elastomer composition comprising a catalyst, (a) an organic diisocyanate, (b) a polyester resin, (c) a chain extender, (d) a crosslinker, (e) a plasticizer, (f) a surfactant, (g) a soluble lignin extract, (h) a foaming agent, and (i) a colorant; and wherein said elastomer has a hardness value of from about 15 Asker C to about 60 Asker C, a tensile strength of from about 1 MPa to about 10 MPa, a resilience of from about 25 percent to about 60 percent, an elongation at break of from about 150 percent to 700 percent, and a tear strength of from about 2 Newtons/millimeters. to about 4 Newtons/millimeters; a composition comprised of a lignin and a plasticizer wherein the lignin is selected from the group consisting of at least one of a pal alkali lignin, a Kraft lignin, a Klason lignin, a hydrolytic lignin, a lignin sulfite, and a lignin sulfate, wherein at least one lignin is dispersed in the plasticizer, followed by extracting the soluble lignin portion, filtering off the bulk of the formed unextracted lignin, and isolating the filtrate containing plasticizer and soluble lignin; and a polyurethane elastomer in the configuration of a foam where the elastomer possesses a hydrolytic stability of from about 80 percent to about 150 percent, possesses a resilience of from about 35 percent to about 45 percent, and a compression set of from about 3 percent to about 6 percent; and wherein said semi-crystalline polyester is selected from the group consisting of poly(1,3-propylene-succinate), and copoly(1,3-propylene-succinate)-copoly(1,2-propylene-succinate); said plasticizer is tributyl citrate, said lignin is a Kraft lignin.

Yet, further disclosed is a process for the preparation of a polyurethane elastomer comprising mixing (b) a polyester resin, (c) a chain extender, (d) a crosslinker, (e) a surfactant, (f) a foaming agent, and (g) a colorant; adding thereto (a) an organic diisocyanate; followed by mixing said (a), (b), (c), (d), (e), (f) and (g), and a composition comprised of a plasticizer and a soluble lignin generated by forming a dispersion of said lignin and said plasticizer, removing the bulk unextracted insoluble lignin, and isolating the filtrate containing said plasticizer and said soluble lignin.

EMBODIMENTS

Polyesters

The disclosed amorphous and semi-crystalline polyester polyol resins can be prepared by a polycondensation process by reacting suitable organic diols and suitable organic diacids in the presence of polycondensation catalysts. Generally, a stoichiometric equimolar ratio of organic diol and organic diacid is utilized, however, an excess of organic diol can be selected such that the resulting polymer displays a hydroxyl number of from about 30 to about 40, an acid number of less than about 5 milligrams/gram of KOH, and more specifically, less than about 3 milligrams/gram of KOH, and with a molecular weight average of from about 1,500 to about 5,000 Daltons as determined by GPC. In some instances, where the boiling point of the organic diol is from, for example, about 180° C. to about 230° C., an excess amount of diol, such as an alkylene glycol like ethylene glycol or propylene glycol of from about 0.2 to 1 mole equivalent, can be utilized and removed during the polycondensation process by distillation. The amount of catalyst utilized varies, and can be selected in amounts as disclosed herein, and more specifically, for example, from about 0.01 percent by weight to about 1 percent by weight, or from about 0.1 to about 0.75 percent by weight based on the crystalline polyester resin.

Examples of organic diacids or diesters selected for the preparation of the amorphous polyester resins and the semi-crystalline polyester resins include fumaric, maleic, oxalic acid, succinic acid, fumaric acid, itaconic acid, glutaric acid, adipic acid, suberic acid, azelaic acid, sebacic acid, 1,12-dodecane dioic acid, C-18 dimer acids, such as 1,16-octadecanedioic acid, phthalic acid, isophthalic acid, terephthalic acid, naphthalene-2,6-dicarboxylic acid, naphathalene-2,7-dicarboxylic acid, cyclohexane dicarboxylic acid, malonic acid and mesaconic acid, and diesters or anhydrides thereof. The organic diacid is selected in an amount of, for example, from about 45 to about 50 percent by weight of the polyester resin. The organic diacid selected can also be those obtained through fermentation process, natural sources like chemically derived from natural (bio-based) sources, such as succinic acid, fumaric acid, itaconic acid, sebacic acid 1,12-dodecanedioic acid, 2,5-furandicarboxylic acid, azelaic acid, dimer acids, which include aliphatic dimer acids with from about 2 carbon atoms to about 36 carbon atoms, such as C-18 dimer acids, or dimerized fatty acids of dicarboxylic acids prepared by dimerizing unsaturated fatty acids obtained from tall oil, usually on clay catalysts; hydrogenated/saturated dimer acids; and other known suitable organic acids.

The organic diol reactant selected can also be obtained from biomasses generated through fermentation process, natural sources, and chemically derived from natural sources, and which reactant is, for example, 1,5-pentanediol, 1,2-propanediol(1,2-propylene glycol), 1,3-propanediol, 1,4-butanediol, 1,10-decanediol, 1,9-nonanediol, dimer diols, which include aliphatic dimer diols with from about 2 carbon atoms to about 36 carbon atoms, such as PRIPOL® and aliphatic diol reactant examples, with, for example, from about 2 carbon atoms to about 36 carbon atoms, include 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl-1,3-propanediol, alkylene glycols like ethylene glycol, propylene glycol, monoethylene glycol, diethylene glycol, monopropylene glycol, dipropylene glycol, isosorbide, mixtures thereof, and the like. The organic diol is selected, for example, in an amount of from about 50 percent by weight to about 60 percent by weight of the polyester.

In embodiments of the present disclosure, examples of specific dimer diols and dimer diacids enabling enhanced hydrophobic characteristics, and thus excellent hydrolytically stable characteristics for the polyesters, include as dimer acids PRIPOL® 1013, PRIPOL® 1017, PRIPOL® 1009, and PRIPOL® 1012, and the dimer diols, PRIPOL® 2033, and PRIPOL® 2043.

Examples of semi-crystalline polyesters, amorphous polyesters, and mixtures thereof, and in some instances where the semi-crystalline polyesters can be converted to an amorphous polyester by altering the amount of the comonomers of the amorphous polyester in the reaction mixture, include semi-crystalline polyester resins with, for example, a melting point range of equal to or less than, for example, about 50° C., such as from about 25° C. to about 49° C., and include those resins derived from straight chain aliphatic organic diols, and straight chain aliphatic organic diacids, such as succinic acid, glutaric acid, adipic acid, suberic acid, azelaic acid, sebacic acid, 1,12-dodecane dioic acid, and straight chain aliphatic organic diols, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, and 1,12-dodecanediol, include polyesters containing poly(1,2-ethylene-succinate), poly(1,2-ethylene-adipate), poly(1,2-ethylene-sebacate), poly(1,2-ethylene-decanoate), poly(1,2-ethylene-nonoate), poly(1,2-ethylene-dodeanoate), poly(1,2-ethylene-azeleoate), poly(1,3-propylene-succinate), poly(1,3-propylene-adipate), poly(1,3-propylene-sebacate), poly(1,3-propylene-decanoate), poly(1,3-propylene-nonoate), poly(1,3-propylene-dodeanoate), poly(1,3-propylene-azeleoate), poly(1,4-butylene-succinate), poly(1,4-butylene-adipate), poly(1,4-butylene-sebacate), poly(1,4-butylene-decanoate), poly(1,4-butylene-nonoate), poly(1,4-butylene-dodeanoate), poly(1,4-butylene-azeleoate), poly(1,6-hexylene-succinate), poly(1,6-hexylene-adipate), poly(1,6-hexylene-sebacate), poly(1,6-hexylene-decanoate), poly(1,6-hexylene-nonoate), poly(1,6-hexylene-dodeanoate), poly(1,6-hexylene-azeleoate), poly(1,8-octylene-succinate), poly(1,8-octylene-adipate), poly(1,8-octylene-sebacate), poly(1,8-octylene-decanoate), poly(1,8-octylene-nonoate), poly(1,8-octylene-dodeanoate), poly(1,8-octylene-azeleoate), poly(1,9-nonylene-succinate), poly(1,9-nonylene-adipate), poly(1,9-nonylene-sebacate), poly(1,9-nonylene-decanoate), poly(1,9-nonylene-nonoate), poly(1,9-nonylene-dodeanoate), poly(1,9-nonylene-azeleoate), poly(1,10-decylene-succinate), poly(1,10-decylene-adipate), poly(1,10-decylene-sebacate), poly(1,10-decylene-decanoate), poly(1,10-decylene-nonoate), poly(1,10-decylene-dodeanoate), poly(1,10-decylene-azeleoate, mixtures thereof, other suitable known suitable components, and the like.

The semi-crystalline polyester resins with melting points as disclosed herein, such as from about 40° C. to about 50° C., and from about 45° C. to about 49° C., can be prepared from a mixture of at least one straight chain aliphatic organic diacid, at least one straight chain aliphatic diol, and a branched aliphatic diol, such as 1,2-propanediol, 1,3-butanediol, 2,3-butanediol, 3,3-dimethyl pentanediol, 1,5-pentanediol, mixtures thereof, and the like. The organic diacid of at least one aliphatic straight chain organic diacid is selected in an amount of, for example, from about 45 to about 50 percent by weight of the polyester resin. The straight chain aliphatic diol is selected in an amount of, for example, from about 20 to about 40 percent by weight of the polyester resin, and the branched aliphatic diol is selected in an amount of, for example, from about 20 percent by weight to about 40 percent by weight of the polyester resin. The polyester resins obtained include copoly(1,3-propylene-succinate)-copoly(1,2-proplyene-succinate), copoly(1,4-butylene-succinate)-copoly(1,2-proplyene-succinate), copoly(1,3-propylene-sebacate)-copoly(1,2-proplyene-sebacate), copoly(1,3-propylene-dodecanoate)-copoly(1,2-proplyene-dodecanoate), copoly(1,3-propylene-azeleoate)-copoly(1,2-proplyene-azeleoate), and the like, and mixtures thereof.

Amorphous polyester resin examples selected for the preparation of the polyurethane elastomers usually do not possess a melting point, and can have a glass transition temperature of, for example, from about −25° C. to about 10° C., and can be prepared from a mixture of at least one or more straight chain aliphatic diacids, branched aliphatic diols with optionally one or more straight chain aliphatic diols. The straight chain aliphatic diol is selected in an amount of, for example, from about 45 to about 50 percent by weight of the polyester resin, and the branched aliphatic diol is selected in an amount of, for example, from about 30 to about 55 percent by weight of the polyester resin, and optionally one or more straight chain aliphatic diols can be selected in an amount of, for example, from about 0 to about 20 percent by weight of the polyester resin. Examples of the obtained polyester resins include copoly(1,2-propylene-succinate)-copoly(1,2-proplyene-sebacate), copoly(1,2-propylene-succinate)-copoly(1,2-propylene-dodecanoate), copoly(1,2-propylene-sebacate)-copoly(1,2-proplyene-dodecanoate), copoly(1,2-propylene-dodecanoate)-copoly(1,2-proplyene-azeloate), copoly(1,2-propylene-azeleoate)-copoly(1,2-proplyene-succinate), poly(butylene-succinate), poly(butylene-2,5-furanate), poly(butylene-itaconate), poly(propylene-succinate), poly(propylene-2,5-furanate), poly(propylene-itaconate), and the like, and mixtures thereof.

The amorphous polyester, the semi-crystalline polyester, and mixtures thereof can be present in the polyurethane elastomer in various effective amounts of, for example, percent by weight of from about 1 to about 99, from about 10 to about 85, from about 18 to about 75, from about 25 to about 65, from about 30 to about 55, and from about 40 to about 60, based for example, on the polyurethane elastomer weight.

Amorphous polyester resin examples selected for the preparation of the polyurethane elastomers usually do not possess a melting point, and can have a glass transition temperature of, for example, from about −25° C. to about 10° C., and can be prepared from a mixture of at least one or more straight chain aliphatic diacids, branched aliphatic diols with optionally one or more straight chain aliphatic diols. The straight chain aliphatic diol is selected in an amount of, for example, from about 45 to about 50 percent by weight of the polyester resin, and the branched aliphatic diol is selected in an amount of, for example, from about 30 to about 55 percent by weight of the polyester resin, and the optionally one or more straight chain aliphatic diols is selected in an amount of, for example, from about 0 to about 20 percent by weight of the polyester resin. These amorphous polyester resins include copoly(1,2-propylene-succinate)-copoly(1,2-proplyene-sebacate), copoly(1,2-propylene-succinate)-copoly(1,2-propylene-dodecanoate), copoly(1,2-propylene-sebacate)-copoly(1,2-proplyene-dodecanoate), copoly(1,2-propylene-dodecanoate)-copoly(1,2-proplyene-azeloate), copoly(1,2-propylene-azeleoate)-copoly(1,2-proplyene-succinate), poly(butylene-succinate), poly(butylene-2,5-furanate), poly(butylene-itaconate), poly(propylene-succinate), poly(propylene-2,5-furanate), poly(propylene-itaconate), and the like, and mixtures thereof.

The amorphous polyester, the semi-crystalline polyester, and mixtures thereof can be present in the polyurethane elastomer in amounts of, for example, percent by weight of from about 1 to about 99, from about 10 to about 85, from about 18 to about 75, from about 25 to about 65, from about 30 to about 55, and from about 40 to about 60 percent by weight based on the polyurethane elastomer weight.

Examples of semi-crystalline polyesters, amorphous polyesters, and mixtures thereof, and in some instances where the semi-crystalline polyesters can be converted to an amorphous polyester by altering the amount of the comonomers of the amorphous polyester in the reaction mixture, are as illustrated herein, and other known suitable polyesters.

The amorphous polyester, the semi-crystalline polyester, and mixtures thereof can be present in the polyurethane elastomer in amounts of, for example, percent by weight of from about 1 to about 99, from about 10 to about 85, from about 18 to about 75, from about 25 to about 65, from about 30 to about 55, and from about 40 to about 60 percent by weight based, for example, on the polyurethane elastomer weight.

Catalysts

Examples of polycondensation catalysts include 1,4-diazabicyclo[2.2.2]octane (DABCO), N,N-bis(3-dimethylaminopropyl)-N-isopropanolamine (commercially available as Jeffcat ZR 50), N-(3-dimethylaminopropyl)-N,N-diisopropanolamine (commercially available as Jeffcat DPA), 1,4-diazabicyclo[2.2.2]octane-2-methanol (commercially available as RZETA) from TOSOH Corporation, tetraalkyl titanates, dialkyltin oxide, such as dibutyltin oxide; tetraalkyltin, such as dibutyltin dilaurate; dialkyltin oxide hydroxide, such as butyltin oxide hydroxide, aluminum alkoxides, alkyl zinc, dialkyl zinc, zinc oxide, stannous oxide, zinc acetate, titanium (iv) isopropoxide (Tyzor TE), tertiary amines, such as triethylamine, dimethylcyclohexylamine, N-methylmorpholine, N,N'-dimethylpiperazine, 2-(dimethylaminoethoxy)ethanol, diazabicyclo[2.2.2]octane, DAPCO 33 LV (33 percent triethylenediamine dissolved in 67 percent dipropylene glycol), BICAT 8109 (bismuth neodecanoate), Jeffcat-Zf-54 (bis-(2-dimethylaminoethyl)ether in dipropylene glycol), KOSMOS® 75 MEG, and the like; organometallic compounds, such as titanic esters, iron compounds; tin compounds, such as tin diacetate, tin dioctoate, tin dilaurate, the dialkyl tin salts of aliphatic carboxylic acids like dibutyltin diacetate and dibutyltin dilaurate, other suitable catalysts, and the like. More specifically, catalysts utilized are comprised of organometallic compounds like titanic esters, iron compounds, tin compounds, and other suitable known catalysts.

The catalysts can be selected in amounts of, for example, from about 0.01 percent by weight to about 5 percent by weight, from about 0.1 to about 0.8 percent by weight, and from about 0.2 to about 0.6 percent by weight, and other suitable percentages, based, for example, on the starting diacid or diester used to generate the polyester resins.

In embodiments of the present disclosure, the catalysts selected for the synthesis of the polyester resins, and that are used in the preparation of the polyurethane elastomer foams remain in, or are retained therein, thus purification processes may be avoided for the polyester synthesis, and products thereof, and for the polyurethane elastomer foams.

Lignin Compositions

Examples of lignin compositions include at least one plasticizer, such as those disclosed herein and at least one lignin; a dispersion of a lignin and a plasticizer where the insoluble lignin is removed by, for example, filtration, and there is isolated the remaining plasticizer and unfiltered lignin which also includes solubilized lignin; and a plasticizer containing a lignin, inclusive of a lignin extract comprised of a mixture of a plasticizer and a soluble lignin.

More specifically, in embodiments at least one lignin and at least one plasticizer is mixed for a duration of from about 30 minutes to about 100 minutes, from about 45 minutes to about 80 minutes, and other suitable times, at a temperature of, for example, from about 25° C. to about 80° C., or from about 40° C. to about 65° C., and other suitable temperatures, followed by filtering off insolubilized lignin and plasticizer that is part of the insolubilized lignin, and isolating the plasticizer that remains and unfiltered lignin which contains solubilized lignin.

Although not being desired to be limited by theory, it is believed that some amount of the lignin is solubilized in the plasticizer, and which solubilization varies with time and temperature. Thus, for example, the amount of solubilized lignin that is extracted can be from about 0.1 percent by weight to about 50 percent by weight, from about 5 percent by weight to about 35 percent by weight, from about 0.1 percent by weight to about 10 percent by weight, from about 0.5 percent by weight to about 10 percent by weight, from about 0.5 percent by weight to about 10 percent by weight, from about 0.3 percent by weight to about 5 percent by weight, from about 3 percent by weight to about 8 percent by weight, from about 0.1 percent by weight to about 30 percent by weight, from about 0.1 percent by weight to about 5 percent by weight, and other suitable percent weight percentages, based for example, on the amount of lignin initially utilized.

Further in embodiments, the lignin may not be removed after extraction with plasticizer or the unextracted lignin can be filtered off, and there remains the lignin/plasticizer that is extracted and that can be selected for the disclosed polyurethane elastomers disclosed.

The amounts of the composition of plasticizer and lignin, and soluble lignin can be arrived at by known methods, such as determined by high-performance liquid chromatography (HPLC), reported as being an analytical chemistry process to separate, identify, and quantify each component in a mixture, relying, for example, on pumps to pass a pressurized liquid solvent containing the sample mixture through a column filled with a solid adsorbent material. Each component in the sample interacts slightly differently with the adsorbent material, causing different flow rates for the different components, and leading to the separation of the components as they flow out of the column.

Examples of lignins selected for the lignin/plasticizer compositions, especially where there is utilized soluble lignin and plasticizer compositions include, alkali lignins, Kraft lignins, Klason lignins, hydrolytic lignins, enzymic mild acidolysis lignins, organosolv lignins, steam explosion lignins, milled wood lignins, lignin sulfones, lignin sulfates (lignosulfonates) including the salts thereof of Ca, Na, Mg, K and Black Liquor, other suitable lignins, and mixtures thereof, to for example, thereby enhance the bio-content of the disclosed elastomers and foams, and render them environmentally friendly while simultaneously preserving or improving the mechanical properties of the elastomers and foams, and which may be used in various applications like insoles, midsoles footwear, Yoga mats, seating cushions, and mattresses.

Plasticizers

The plasticizer is selected, for example, from tributyl-citrate, CITROFOL®, available from Jungbunzlauer, Hallstar IM 8830, an ester available from Hallstar, triethyl-citrate, trimethyl-citrate, adipates, such as EDENOL® 650R, available from Emery Olechemicals, tributyl citrate, alkyl aryl phthalates, alkyl benzyl phthalates, including butyl benzyl phthalate, alkyl benzyl phthalate, and wherein the alkyl group has a carbon chain of from seven to nine carbon atoms, TEXANOL™, benzyl phthalate, (2,2,4-trimethyl-1,3-pentanediol-monobutyrate benzyl phthalate), alkylphenyl phthalate, symmetrical and unsymmetrical dialkyl phthalates, including diisononyl phthalate, diisodecyl phthalate, dioctyl phthalate, di-n-butyl phthalate, dioctyl phthalate, dihexyl phthalate, diheptyl phthalate, butyloctyl phthalate, linear dialkyl phthalate, wherein the alkyl groups are independently carbon chains having from about seven to about eleven carbon atoms, and butyl cyclohexyl phthalate; phosphate plasticizers, such as tris-(2-chloro-1-methylethyl) phosphate, tris-(alpha-chloroethyl)phosphate (TCEP), tris-(2,3-dichloro-1-propyl)phosphate, YOKE-V6 (tetrakis-(2-chloroethyl)dichloroisopentyldiphosphate), and the like; phosphate ester plasticizers, such as, for example, 2-ethyl-hexyl diphenyl phosphate, isodecyl diphenyl phosphate, mixed dodecyl and tetradecyl diphenyl phosphate, trioctyl phosphate, tributyl phosphate, butylphenyl diphenyl phosphate, and isopropylated triphenyl phosphate; and benzoate plasticizers, such as, for example, TEXANOL™ benzoate (which is 2,2,4-trimethyl-1,3-pentanediol-monobutyrate benzoate), glycol benzoate, propylene glycol dibenzoate, dipropylene glycol is dibenzoate, and tripropylene glycol dibenzoates, in amounts of, for example, from about 1 percent by weight to about 30 percent by weight, from about 1 percent by weight to about 15 percent by weight, from about 5 percent by weight to about 20 percent by weight, from about 10 percent by weight to about 15 percent by weight, and other suitable weight percentages, based, for example, on the amount of the polyurethane elastomer.

The plasticizer and lignin composition can be prepared, for example, by dispersing with agitation the percentages by weight disclosed herein, including, for example, from about 95 to about 99 percent by weight of plasticizer and from about 1 to about 5 percent by weight of lignin at a temperature of from about 20° C. to about 90° C. for a duration of from about 1 minute to about 120 minutes.

More specifically, the plasticizer containing a lignin extract or solubilized lignin can be prepared, for example, by dispersing with agitation of from about 95 to about 99 percent by weight of plasticizer, and from about 0.1 to about 5 percent by weight of lignin at a temperature of from about 20° C. to about 90° C. for a duration of from about 1 minute to about 120 minutes, after which the mixture is filtered by vacuum filtration and allowed to cool to room temperature, about 25° C. The resulting filtrate in specific embodiments is comprised, for example, of from about 95.1 to about 99.9 percent by weight of plasticizer and from about 0.1 to about 4.99 percent by weight of solubilized lignin extract. In embodiments, the amount of lignin that is extracted or solubilized is, for example, as disclosed herein, and in embodiments is from about 0.1 percent by weight to about 30 percent by weight, from about 0.1 to about 20 percent by weight, and from about 0.1 percent by weight to 10 percent by weight, and other suitable percentages.

Bio-Additives

Examples of the optional bio-additives include those as disclosed in copending U.S. patent application Ser. No. 17/107,381, such as chitin, Nutmeg, derived from its seed thereof and mace the seed covering, and chitosan (obtained from Tidal Vision), eggshells (obtained from Lady Gouldian Finch), hazelnut shells (obtained from Grimo Nut Nursery), walnut shells, peanut shells, Brazilian nutshells, pecan shells, cashew nutshells, almond shells, chestnut shells, macadamia nutshells, pistachio nutshells, pine nutshells, cellulose, mixtures thereof; a bio-additive selected from the group consisting of chitin, chitosan, eggshell, hazelnut shell, walnut shell, peanut shell, Brazilian nutshell, pecan shell, cashew nutshell, almond shell, chestnut shell, macadamia nutshell, pistachio nutshell, pine nutshell, cellulose, and mixtures thereof.

The amount of bio-additives when present varies, and can be selected in, for example, amounts of from about 0.01 percent by weight to about 10 percent by weight, from about 0.5 percent by weight to about 5 percent by weight, from about 1 percent by weight to about 4 percent by weight, based, for example, on the polyurethane composition.

With the presence of at least one bio-additive it assists in maintaining and increasing the bio-content of the polyurethane elastomers and foams thereof to, for example, about 95 percent.

Crosslinkers

The crosslinker, which is an optional component, is, for example, selected from diethanolamine, glycerol, trimethylolpropane, pentaerythritol, 1,2,4-butanetriol, thioglycolic acid, 2,6-dihydroxybenzoic acid, melamine, diglycolamine, 1,2,6-hexanetriol, glycerol, 1,1,1-trimethylolethane, 1,1,1-trimethylolpropane (TMP), triisopropanol amine, triethanol amine, tartaric acid, citric acid, malic acid, trimesic acid, trimellitic acid, trimellitic anhydride, pyromellitic acid, and pyromellitic dianhydride, trimethylolethane; polyethertriols, tartaric acid, citric acid, malic acid, trimesic acid, trimellitic acid, trimellitic anhydride, pyromellitic acid, and pyromellitic dianhydride; trimethylolethane, and glycerol, and especially polyols, such as trimethylolpropane, and bio-based materials thereof, present in amounts of, for example, from about 0.1 percent by weight to about 10 percent by weight, and from about 0.1 percent by weight to about 5 percent by weight, based on the amount of polyurethane elastomer, and other known suitable crosslinkers. The crosslinker in embodiments can be used to increase the molecular weight of the polyurethane by interlinking the chains thereof to provide a more rigid network.

Chain Extenders

Chain extender examples include alcohols, such as polyhydric alcohols, carboxylic acid derivatives having two functional groups can be selected for the elastomers and processes disclosed herein. More specifically, chain extender examples contain, for example, two hydroxyl moieties such as 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl 1,3-propanediol; alkylene glycols like ethylene glycol, propylene glycol, monoethylene glycol, diethylene glycol, monopropylene glycol, dipropylene glycol, mixtures thereof, other known suitable chain extenders, and the like, present in amounts of, for example, from about 0.1 percent by weight to about 10 percent by weight, from about 0.1 percent by weight to about 5 percent by weight, based on the polyurethane elastomer, and other known suitable chain extenders. The chain extender, which can be a low molecular weight diol that reacts with a diisocyanate to provide for polyurethane molecular weight increases, and to increase the block length of the polyurethane hard segment without crosslinking of the chains thereof.

Surfactants

The surfactants that can be selected are, for example, polyether-silicone oil mix (TEGOSTAB® B4113) available from Evonik, 8383, silicone surfactant DABCO DC® 193, and TEGOSTAB® B8383, available from Evonik, sodium dodecylbenzene sulfonate, sodium dodecylnaphthalene sulfate, dialkylbenzenealkyl, sulfates and sulfonates, adipic acid, available from Aldrich, NEOGEN R™, NEOGEN SC™, available from Daiichi Kogyo Seiyaku, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210™, IGEPAL CA-520™, IGEPAL CA-720™, IGEPAL CO-890™, IGEPAL CO-720™, IGEPAL CO-290™, ANTAROX 890™, and ANTAROX 897™, and other suitable known surfactants in amounts of, for example, from about 0.1 percent by weight to about 10 percent by weight, from about 0.1 percent by weight to about 3 percent by weight, and from about 0.5 to about 1 percent by weight based on the polyurethane elastomer amount.

Colorants

Colorant examples that can be selected for the preparation of the polyurethane elastomer compositions present, for example, in amounts of from about 1 percent by weight to about 10 percent by weight, 0.1 percent by weight to about 5 percent by weight, and from about 0.1 percent by weight to about 3 percent by weight, based on the amount of the polyurethane elastomer, include pigments, dyes, mixtures thereof, and the like. Examples of dyes and pigments include inorganic pigments, such as carbon black, whiteners, such as titanium oxide which has weather resistance, and organic pigments and dyes, such as phthalocyanine blue, azo dyes, Indigo, Congo Red, Methyl Orange, Malachile Green, purple dyes, brown dyes, black dyes, Pigment Blue 15:3 or C.I. Pigment Blue 15:4, phthalocyanine green, quinacridone red, indanthrene orange, and isoindolinone yellow, C.I. Pigment Red 254 and C.I. Pigment Red 122, C.I. Pigment Yellow 151 and C.I. Pigment Yellow 74, Fates Dye and Keen Dye, available from BAO Shen Polyurethane Tech. LTD-China, and other suitable known colorants, such as known dyes and pigments illustrated in the Color Index (C.I.), such as known magenta, yellow, and cyan colorants.

Foaming Agents

There is selected as the foaming (or blowing) agent water and other suitable known blowing agents present in the reaction mixture, and in the flexible polyurethane foams thereof, and which increases the firmness of the resulting foams. A soft, flexible, plasticized water-blown polyurethane foam composition can be produced from the reaction of a natural polyol and methylene diphenyl diisocyanate (MDI), or an equivalent isocyanate, and by optionally adding a plasticizer.

Specific examples of foaming agents include water, compressed gases, such as $CO_2$, $N_2$, air or low boiling liquids like cyclopentane, pentane, isobutane and hydrofluorocarbons added in amounts of from about 0.03 to about 10 percent by weight, and from about 0.5 percent by weight to about 3 percent by weight of the polyurethane elastomer. Also, for example, $CO_2$ may be generated in-situ by the decomposition of $NaHCO_3$ or the reaction of water with isocyanate.

Organic Diisocyanates

Examples of organic diisocyanates selected for the compositions and processes illustrated herein include aliphatic diisocyanates, such as hexamethylene diisocyanate, cycloaliphatic diisocyanates, such as isophorone diisocyanate, cyclohexane 1,4-diisocyanate, 1-methylcyclohexane 2,4-diisocyanate, and 1-methylcyclohexane 2,6-diisocyanate, and the corresponding isomer mixtures, dicyclohexylmethane 4,4'-diisocyanate, dicyclohexylmethane 2,4'-diisocyanate, dicyclohexylmethane 2,2'-diisocyanate, and the corresponding isomer mixtures, aromatic diisocyanates, such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate, and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane, and naphthylene 1,5-diisocyanate. Especially selected diisocyanates are hexamethylene 1,6-diisocyanate, cyclohexane 1,4-diisocyanate, isophorone diisocyanate, dicyclohexylmethane diisocyanate, diphenylmethane diisocyanates with equal to or in excess of about 96 percent by weight content of diphenylmethane 4,4'-diisocyanate, diphenylmethane 4,4'-diisocyanate, and naphthylene 1,5-diisocyanate, suitable known diisocyanates, and mixtures thereof.

In embodiments, there can be selected mixtures of a diisocyanate and a polyisocyanate in an amount of up to about 15 percent by weight, based on the total diisocyanates present, however, up to about 40 percent by weight of polyisocyanate can be added, and that provides an improved thermoplastically processable product. Examples of polyisocyanates include triisocyanates, biurets and isocyanurate trimer. For example, triphenylmethane 4,4',4''-triisocyanate and polyphenylpolymethylene polyisocyanates as well as hexamethylene diisocyanate (HDI) biuret trimer, isocyanurate trimer, and isophorone (IPDI) isocyanurate trimer.

The characteristics and properties of the polyurethane products can be measured as illustrated herein, and by known processes and devices. More specifically, there was selected as a tensile tester, the ADMET eXpert 7601 Tensile Tester, to measure tensile strength, elongation, tear strength and compression set, by preparing a sample of the polyurethane elastomer, such as a foam material in dog bone shapes with a die cutter with a standard thickness of 10 millimeters and length of 140 millimeters based on ASTM D412, ASTM D3574-17, SATRA TM-2 standards. The sample removed was placed between clamps and where the tensile tester applies the appropriate force at a particular speed (generated by the software) on the test material sample to provide the characteristics, properties and values of the polyurethane products.

Density was measured using the equation Density=Mass/Volume, where mass represents the mass of the material in a mold measured on an analytical balance. Volume of the mold was obtained from the dimensions of the mold. For example, if a mold was producing 10 millimeters, or 1 centimeter polyurethane foam plaques with dimensions length equal to 21 centimeters, width equal to 14.8 centimeters, and the thickness equal to 10 millimeters, then volume was calculated to be 21 times 14.8 times 1 equals 310.80 centimeters$^3$.

The hardness can be measured on the Asker C scale, and can also be measured by a durometer.

Bio-Content

The bio-content of the disclosed polyurethane elastomer foams can be determined by various methods. In one method, the bio-content can be measured as follows and where, for example, the lignin composition, the polyester polyol, plasticizer, optionally bio-additive and chain extender which also impart bio-content characteristics to the polyurethane elastomer foams.

Add the total weight of all the components/ingredients=X grams;

Add the weight of the component ingredients that are bio-based, the polyester resin plus the chain extender plus the plasticizer and lining composition, and optionally the bio-additive, optionally the bio-additive=Y grams;

Total bio-content=(Y/X)×100=the bio-content in percent.

Thus, based on the bio-content of the ingredients present in the polyurethane foam formulations, the bio-content for the polyurethane elastomer foam is, for example, from about 60 percent to about 95 percent, from about 40 percent to about 85 percent, from about 70 percent to about 85 percent, and from about 60 percent to about 80 percent.

Generally, for the polyurethane plasticizer foam preparation in embodiments and the appropriate Examples that follow, the active reactant components of, for example, the polyester resin, the crosslinker, the chain extender, and the foaming agent, and the non-reactive components of, for example, colorant, plasticizer, and surfactant, are initially admixed followed by the addition of the lignin plasticizer composition, and then the reaction addition of the organic diisocyanate and heating. Further, the disclosed bio-degradable polyurethane elastomer foams have excellent bio-contents partly originating, for example, from the polyester polyol, the plasticizer, the lignin or lignin extract, and the chain extender.

More specifically, although it is not desired to be limited by theory, generally, for the polyurethane plasticizer foam preparation in embodiments and the appropriate Examples that follow the active reactant components of, for example, the polyester resin, the crosslinker, the chain extender, and the foaming agent, and the components of, for example, dye, plasticizer, and surfactant are initially admixed followed by the addition of the soluble lignin extract and remaining plasticizer, and organic diisocyanate and heating. The polyester that contains at least one hydroxyl end group, that is the polyester polyol, reacts with the diisocyanate resulting in a urethane linkage. The chain extender of, for example, 1,3-propanediol, which also has hydroxyl ends, reacts with the diisocyanate to generate urethane linkages. The crosslinker of, for example, diethanol amine, includes two hydroxyl moieties and one amine (N—H) moiety, and where all 3 functionalities react with the diisocyanate to form either the urethane or urea linkage, respectively. Finally, the foaming agent like water reacts with the diisocyanate to result in an amine, and that amine further reacts with the diisocyanate to give the urea linkage. The elastomer foam can be referred to as a polyurethane, however, it is known and accepted that when a crosslinker like diethanolamine, and the foam agent like water are present there will be some urea linkages, albeit very small, such as less than about 3.5 percent.

Semi-crystalline refers, for example, to polymers with a highly ordered molecular structure and with sharp melting points. These polymers also have some degree of amorphous regions where the chains are disordered, while the crystalline polymers have a higher degree of long-range order in a polymer material which makes them very rigid with a high melting point.

TEGOSTAB® B4113 and B8383 are considered silicone surfactants; CA-210 is a surfactant of octylphenoxy poly (ethyleneoxy)ethanol; CA-520 is a polyoxyethylene (5) isooctylphenyl ether surfactant; ANTAROX® 890 is an olyoxyethylene (40) nonylphenyl ether surfactant; and ANTAROX® 897 is a poly(oxy-1,2-ethanediyl), α-(non-ylphenyl)-ω-hydroxy surfactant.

Polyester polyol PSA300 is a polyester polyol with a weight average molecular weight of about 3,000; ISO is diisocyanate, a commercially available diisocyanate SUPRASEC™ 2379; MDI is diphenyl methane diisocyanate (MDI); and FATES® dye is an orange polyester dye that is commercially available. The chemical name for FATES® dye has not been disclosed by the supplier. Further examples of dyes are timerland orange, timerland lime green, timerland dark cheddar, all available from BAO Shen Polyurethane Tech.LTD-China; and DABCO® 33LV is an amine catalyst of 33 percent TEDA (triethylene diamine) dissolved in dipropylene glycol. Abrasion refers to a material's ability to withstand wear as it encounters friction.

Percent by weight is a known phrase, especially to one of ordinary skill in this art, and can be calculated, for example, based on the amount of the component present in the polyurethane elastomer divided by the total amount of all polyurethane elastomer components multiplied by 100. In other instances, the percent by weight may be calculated by various methods and, for example, the methods as may be illustrated herein.

Specific embodiments of the present disclosure as illustrated in the following Examples are for illustrative purposes and are not limited to the materials, conditions, or process parameters set forth in these embodiments. Parts and percentages are by weight unless otherwise indicated. Also, the components can be mixed in various sequences to obtain the polyurethane elastomers and the polyurethane foams, which can be biodegradable. The viscosities were measured by the Brookfield CAP2000 Viscometer. A footbed mold refers to a mold with a cavity of certain design replicating an insole or a midsole of footwear like a shoe. The cavity has a certain volume when the formulation mixture poured and closed to form the foam product.

Example 1 (Comparative)

Preparation of a non-lignin containing insole plaque polyurethane foam derived from 58.6 weight percent (percent by weight) of polyol, 17.6 weight percent of plasticizer, 18.5 weight percent of diisocyanate, 1.72 weight percent of chain extender, 2.14 weight percent of dye, 0.59 weight percent of catalyst, 0.32 weight percent of surfactant and 0.52 weight percent of water.

72 Grams (gm) of a polyester, derived from succinic acid and 1,3-propanediol (available as PS3000 from Panolam Industries), were melted in a 400 milliliters glass can at 70° C. for 2 hours in an oven. 0.396 Gram of TEGOSTAB® surfactant (available from Evonik), 2.11 grams of 1,3-propanediol (chain extender), 0.72 gram of DABCO LV® catalyst (available from Evonik), 0.634 gram of water, 2.63 grams of Red dye (available from BAO Shen Polyurethane Tech. LTD-China), 21.6 grams of tributyl citrate (plasticizer available from Jungbunzlauer as CITROFOL®) and the resulting mixture was stirred for 30 minutes at 2000 rpm to ensure homogeneity. The mixture was then added to the empty glass can, and stirred for 4 minutes at 2000 rpm to form a dispersion. While stirring, 22.75 grams of a diisocyanate (available from Huntsmanas as Rubinate 1680) were injected into the resulting dispersion via a pre-weighed syringe. After the syringe was empty, the mixture resulting was stirred for a further 5 seconds and 99.5 grams of this mixture were then poured into a plaque mold which had a volume of 311 centimeters$^3$ (21 centimeters Length×18.8 centimeters Width×1 centimeters Thickness). The mold temperature was at 50° C. to 55° C., and the curing time was 30 minutes resulting in a plaque density of about 0.32 gram/centimeters$^3$. Subsequently, the plaques were tested for mechanical properties and bio-content after cutting into appropriate dog-bone shapes according to ASTM D3574. The mechanical properties and bio-content are represented in Table 1.

For the Lab Examples 2 to 20 that follow, the lignin is Kraft Lignin available from West Fraser Mill Ltd.

Examples 2 to 8

General preparation of an insole plaque polyurethane foam according to Example 1, with the addition of a composition of a plasticizer and from about 0.5 to about 4 weight percent (percent by weight throughout) of lignin.

72 Grams (gm) of a semi-crystalline polyester, derived from succinic acid and 1,3-propanediol (available as PS3000 available from Panolam Industries), were melted in a 400 milliliters glass can at 70° C. for 2 hours in an oven, 0.396 gram of TEGOSTAB® surfactant (available from Evonik), 2.11 grams of 1,3-propanediol (chain extender), 0.72 gram of DABCO LV® catalyst (available from Evonik), 0.634 gram of water, 2.63 grams of Red dye (available from BAO Shen Polyurethane Tech. LTD-China).

A number of compositions of soluble Kraft lignin (available from West Fraser Mills Ltd) at 0.40, 0.78, 1.2, 1.6, 2.0, 2.4, and 4 percent by weight (see Table 1) were added respectively to 21.6 grams of the tributyl citrate (plasticizer available from Jungbunzlauer as CITROFOL®), as disclosed in Table 1, and the mixtures resulting were stirred for 30 minutes at 2000 rpm to ensure homogeneity. These mixtures were independently added, respectively, to the glass can, and each of the mixtures was stirred for 4 minutes at 2000 rpm to form dispersions. While stirring, 22.75 grams of a Diphenylmethane Diisocyanate (available from Huntsmanas Rubinate 1680) were injected into each of the dispersions via a pre-weighed syringe. After the syringe was empty, the mixtures resulting were stirred for a further 5 seconds and 99.5 grams of each mixture were then poured into a plaque mold which had a volume of 311 centimeters$^3$ (21 centimeters Length×18.8 centimeters Width×1 centimeter Thickness). The mold temperature was at 50° C. to 55° C., resulting in a plaque density of about 0.32 gram/centimeters$^3$. The mold temperature was at 50° C. to 55° C., and the curing time was 30 minutes. Subsequently, the plaques were tested for mechanical properties after cutting them into appropriate dog-bone shapes according to ASTM D3574. The mechanical properties and bio-contents are represented in Table 1.

TABLE 1

Mechanical Properties of PU Plaques Incorporated Into Lignin at Different Weight Fractions

| Examples | Lignin (wt %) | Hardness | Tensile Strength (MPa) | Elongation (%) | Die C Tear (N/mm) | Split Tear Strength (N/mm) | Resilience (%) | Bio-content |
|---|---|---|---|---|---|---|---|---|
| 1 | 0 | 27 | 1.03 | 384 | 5.9 | 1.66 | 35 | 77.9 |
| 2 | 0.4 | 27 | 0.925 | 403 | 5.93 | 1.54 | 42 | 78.0 |
| 3 | 0.8 | 27 | 0.917 | 464 | 6.04 | 1.75 | 41 | 78.1 |
| 4 | 1.2 | 28 | 1.21 | 460 | 7.01 | 1.95 | 45 | 78.2 |
| 5 | 1.6 | 28 | 1.01 | 398 | 6.62 | 2.05 | 37 | 78.3 |
| 6 | 2.0 | 28 | 0.74 | 362 | 5.73 | 1.52 | 35 | 78.4 |
| 7 | 2.4 | 28 | 1.10 | 413 | 6.93 | 2.04 | 40 | 78.5 |
| 8 | 4.0 | 33 | 1.13 | 400 | 7.04 | 2.08 | 37 | 78.8 |

The results from Table 1, indicate that for Examples 2 to 8, wherein lignin was added in an amount of from 0.4 weight percent (percent by weight) to 4 weight percent resulted in improvement in mechanical properties overall, as compared to Comparative Example 1 without the use of lignin. Specifically, the use of lignin provides an improved overall performance in hardness, die c tear, split tear strength, elongation, and comparable or an improved performance in tensile strength and resilience.

Example 9

Preparation of an insole plaque polyurethane foam derived from 58.14 weight percent of polyol, 18.37 weight percent of diisocyanate, and 17.44 weight percent of plasticizer, 1.7 weight percent of chain extender, 2.12 weight percent of dye, 0.59 weight percent of catalyst, 0.32 weight percent of surfactant, 0.51 weight percent of water, and an extract of plasticizer containing 0.81 weight percent of lignin.

21.6 Milliliters of the plasticizer, tributyl citrate (available from Jungbunzlauer as CITROFOL®), and 1 gram of lignin (available as Kraft Lignin from West Fraser Mill Ltd) in a 250 milliliters container were mixed using a high torque stirrer (CAFRAMO) with a Marine Style Mixing Impeller at speed range of 2000 RPM for 30 minutes. Subsequently, the mixture was placed in oven at a 60° C. temperature for 15 minutes. The mixture was then filtered through a Whatman #1 filter paper, and the filtrate was then allowed to cool to room temperature, about 25° C., and was comprised of the plasticizer and solubilized lignin extract. The filtered insoluble lignin plasticizer portion was discarded. To this were then added 72 grams (gm) of a polyester resin, derived from succinic acid and 1,3-propanediol (available as PS3000 from Panolam Industries), preheated to 70° C., followed by adding 0.396 gram of TEGOSTAB® surfactant (available from Evonik), 2.11 grams of 1,3-propanediol (chain extender), 0.72 gram of DABCO LV® catalyst (available from Evonik), 0.634 gram of water, and 2.63 grams of Red dye (available from BAO Shen Polyurethane Tech. LTD-China), and the resulting mixture stirred for 30 minutes at 2000 rpm to ensure homogeneity. While stirring, 22.75 grams of a Diphenylmethane Diisocyanate (available from Huntsmanas as Rubinate 1680) were injected into each of the obtained dispersions via a pre-weighed syringe. After the syringe was empty, the mixture resulting was stirred for a further 5 seconds; 99.5 grams of these mixtures were then poured into a plaque mold which had a volume of 311 centimeters³ (21 centimeters Length×18.8 centimeters Width×1 centimeter Thickness). The mold temperature was at 50° C. to 55° C., the curing time was 30 minutes, and there resulted plaques with a density of about 0.32 gram/centimeters³. Subsequently, the plaques were tested for mechanical properties according to ASTM D3574. The bio-based content of the polyurethane was about 78.1 percent. The results, such as the mechanical properties, are represented in the following Table 2, presented in Example 11.

Example 10

Preparation of an insole plaque polyurethane foam derived from 57.22 weight percent of polyol, 18.08 weight percent of diisocyanate, 1.68 weight percent of chain extender, 2.09 weight percent of dye, 0.57 weight percent of catalyst, 0.31 weight percent of surfactant, 0.5 weight percent of water, and an extract containing 2.4 weight percent of lignin.

21.6 Milliliters of the plasticizer, tributyl citrate (available from Jungbunzlauer as CITROFOL®), and 3 grams of lignin (available as Kraft Lignin from West Fraser Mill Ltd) in a 250 milliliters container were mixed using a high torque stirrer (CAFRAMO) with a Marine Style Mixing Impeller at speed range of 2000 RPM for 30 minutes. Subsequently, the resulting mixture was placed in oven at a 60° C. temperature for 15 minutes. The mixture resulting was then filtered through a Whatman #1 filter paper, and the filtrate was then allowed to cool to room temperature, and was comprised of the plasticizer and solubilized lignin extract. The filtered insoluble lignin portion was discarded. To the filtrate were then added 72 grams (gm) of a polyester resin, derived from succinic acid and 1,3-propanediol (available as PS3000 from Panolam Industries), then preheated to 70° C., followed by adding 0.396 gram of TEGOSTAB® surfactant (available from Evonik), 2.11 grams of 1,3-propanediol (chain extender), 0.72 gram of DABCO LV® catalyst (available from Evonik), 0.634 gram of water, and 2.63 grams of Red dye (available from BAO Shen Polyurethane Tech. LTD-China), and the resulting mixtures were stirred for 30 minutes at 2000 rpm to ensure homogeneity. While stirring, 22.75 grams of Diphenylmethane Diisocyanate (available from Huntsmanas as Rubinate 1680) were injected into each of the dispersions (mixtures) via a pre-weighed syringe. After the syringe was empty, the mixtures resulting were stirred for a further 5 seconds, and 99.5 grams of each mixture were then poured into a plaque mold which had a volume of 311 centimeters³ (21 centimeters Length×18.8 centimeters Width×1 centimeter Thickness). The mold temperature was at 50° C. to 55° C., and was cured for 30 minutes, resulting in a plaque density of about 0.32 gram/centimeters³. Subsequently, the plaques were tested for mechanical properties and bio-content after cutting into appropriate dog-bone shapes according to ASTM D3574. The bio-based content of the polyurethane of this Example was about 78.5 weight percent. The results, such as the mechanical properties, are represented in the following Table 2, presented in Example 11.

Example 11

Preparation of an insole plaque polyurethane foam derived from 56.28 weight percent of polyol, 17.78 weight percent of diisocyanate, 1.65 weight percent of chain extender, 2.06 weight percent of dye, 0.56 weight percent of catalyst, 0.31 weight percent of surfactant, 0.5 weight percent of water, and an extract containing 3.99 weight percent of lignin.

21.6 Milliliters of the plasticizer, tributyl citrate (available from Jungbunzlauer as CITROFOL®), and 5.1 grams of lignin (available as Kraft Lignin from West Fraser Mill Ltd) in a 250 milliliters container was mixed using a high torque stirrer (CAFRAMO) with a Marine Style Mixing Impeller at speed range of 2000 RPM for 30 minutes. Subsequently, the mixture was placed in oven at a 60° C. temperature for 15 minutes. The resulting mixture was then filtered through a Whatman #1 filter paper, and the filtrate was then allowed to cool to room temperature, about 25° C., and was comprised of the plasticizer and solubilized Kraft lignin extract. The filtered insoluble lignin portion was discarded. To the filtrate were then added 72 grams (gm) of a polyester resin, derived from succinic acid and 1,3-propanediol (available as PS3000 from Panolam Industries), preheated to 70° C., followed by adding 0.396 gram of TEGOSTAB® surfactant (available from Evonik), 2.11 grams of 1,3-propanediol (chain extender), 0.72 gram of DABCO LV® catalyst (available from Evonik), 0.634 gram of water, and 2.63 grams of Red dye (available from BAO Shen Polyurethane Tech. LTD-China), and the resulting mixture was then stirred for 30 minutes at 2000 rpm to ensure homogeneity. While stirring, 22.75 grams of a Diphenylmethane Diisocyanate (available from Huntsmanas as Rubinate 1680) were injected into each of the dispersions via a pre-weighed syringe. After the syringe was empty, the mixture resulting was stirred for a further 5 seconds, and 99.5 grams of this mixture were then poured into a plaque mold which had a volume of 311 centimeters$^3$ (21 centimeters Length×18.8 centimeters Width×1 centimeter Thickness). The mold temperature was at 50° C. to 55° C., and the curing was for 30 minutes, resulting in a plaque density of about 0.32 gram/centimeter$^3$. Subsequently, each of the obtained, resulting from the above separate mixtures, plaques were tested for mechanical properties and bio-content after cutting into appropriate dog-bone shapes according to ASTM D3574. The bio-based content of the polyurethane obtained from the above first mixture of this Example, (Example 9) was about 78.9 weight percent. The results, such as the mechanical properties, are represented in the following Table 2.

TABLE 2

| Examples | Lignin (wt %) | Hardness | Tensile Strength (MPa) | Elongation (%) | Die C Tear (N/mm) | Split Tear Strength (N/mm) | Resilience (%) |
|---|---|---|---|---|---|---|---|
| 9 | 0.81 | 25 | 0.77 | 416 | 5.14 | 1.60 | 37 |
| 10 | 2.4 | 26 | 1.05 | 464 | 6.30 | 1.98 | 41 |
| 11 | 4.0 | 33 | 1.17 | 393 | 7.78 | 2.08 | 35 |

The results from Table 2 indicate that in Examples 9 to 11, wherein the plasticizer containing an extract of soluble lignin resulted in improvements in mechanical properties proportional, for example, to increasing amounts of soluble lignin extract, as compared to Comparative Example 1 without the use of lignin. Specifically, the use of lignin extract provides an improved overall performance in hardness, die c tear, split tear strength, and tensile strength.

Examples 12 to 16

Preparation of an insole footbed polyurethane foam with reduced density derived from 57.2 weight percent of polyol, 18.1 weight percent of diisocyanate, 1.68 weight percent of chain extender, 2.1 weight percent of dye, 0.57 weight percent of catalyst, 0.31 weight percent of surfactant, 0.5 weight percent of water, and 17.2 weight percent of plasticizer, an extract of 2.4 weight percent of lignin.

21.6 Milliliters of the plasticizer, tributyl citrate (available from Jungbunzlauer as CITROFOL®), and 3 grams of lignin (available as Kraft Lignin from West Fraser Mill Ltd) in a 250 milliliters container were mixed using a high torque stirrer (CAFRAMO) with a Marine Style Mixing Impeller at speed range of 2000 RPM for 30 minutes. Subsequently, each of the resulting mixtures was placed in oven at a 60° C. temperature for 15 minutes. The individual mixtures resulting were then filtered through a Whatman #1 filter paper, and the filtrates were then allowed to cool to room temperature, and each mixture was comprised of the tributyl citrate plasticizer and solubilized lignin extract. The filtered insoluble lignin portions were discarded. To each of the filtrates were then added 72 grams (gm) of a semi-crystalline polyester resin, derived from succinic acid and 1,3-propanediol (available as PS3000 from Panolam Industries), then preheated to 70° C., followed by adding 0.396 gram of TEGOSTAB® surfactant (available from Evonik), 2.11 grams of 1,3-propanediol (chain extender), 0.72 gram of DABCO LV® catalyst (available from Evonik), 0.634 gram of water, and 2.63 grams of Red dye (available from BAO Shen Polyurethane Tech. LTD-China), and the resulting mixtures were stirred for 30 minutes at 2000 rpm to ensure homogeneity. While stirring, 22.75 grams of Diphenylmethane Diisocyanate (available from Huntsmanas as Rubinate 1680) were injected into each of the dispersions (mixtures) via a pre-weighed syringe. After the syringe was empty, the mixtures resulting were stirred for a further 5 seconds, and various amounts of this mixture (listed in Table 3 as Mold mass) were then poured into a plaque molds which had a volume of 311 centimeters$^3$ (21 centimeters Length×18.8 centimeters Width×1 centimeters Thickness). The mold temperature was at 50° C. to 55° C., and the mixtures were cured for 30 minutes, resulting in plaques with, for example reduced densities of about 0.30 to 0.26 gram/centimeters$^3$ (listed in Table 3). Subsequently, the plaques were tested for mechanical properties and bio-content after cutting into appropriate dog-bone shapes according to ASTM D3574. The bio-based content of the polyurethane of this Example (Example 10) was about 78.5 weight percent. The results, such as the mechanical properties, are represented in the following Table 3.

TABLE 3

Mechanical Properties of PU Plaques

| Examples | Lignin (wt %) | Density (g/cm$^3$) | Mold Mass (g) | Hardness | Tensile Strength (MPa) | Elongation (%) | Die C Tear (N/mm) | Split Tear Strength (N/mm) | Resilience (%) |
|---|---|---|---|---|---|---|---|---|---|
| 1 | 0 | 0.32 | 99.5 | 27 | 1.03 | 384 | 5.89 | 1.66 | 35 |
| 10 | 2.4 | 0.32 | 99.5 | 26 | 1.05 | 464 | 6.30 | 1.98 | 41 |
| 12 | 2.4 | 0.30 | 93.3 | 29 | 1.16 | 438 | 7.7 | 2.06 | 41 |
| 13 | 2.4 | 0.29 | 90.2 | 28 | 0.92 | 351 | 6.0 | 2.02 | 42 |
| 14 | 2.4 | 0.28 | 87.1 | 26 | 0.91 | 362 | 7.89 | 1.77 | 44 |
| 15 | 2.4 | 0.27 | 84.0 | 22 | 1.01 | 442 | 6.42 | 2.00 | 42 |
| 16 | 2.4 | 0.26 | 80.9 | 21 | 0.98 | 392.7 | 6.73 | 1.74 | 39 |

The results of Table 3 indicate that for Examples 12 to 16, wherein the lignin compositions were comprised of the above plasticizer and an extract of 2.4 percent by weight of soluble lignin, resulted in improvements in mechanical properties versus Comparative Example 1 which contains no plasticizer lignin extract. Furthermore, the mechanical properties were maintained with decreasing density of the foam in Examples 13 to 16. Specifically, the use of the plasticizer lignin extract results in improved performance in hardness, die c tear, split tear strength, and tensile strength as compared to no lignin extract present Comparative Example 1.

Example 17 (Comparative)

Preparation of a midsole plaque polyurethane foam derived from 55.6 weight percent of polyol, 23.4 weight percent of diisocyanate, 2.78 weight percent of chain extender, 2.05 weight percent of dye, 3.89 weight percent of polysaccharide, 0.25 weight percent of catalyst, 0.31 weight percent of surfactant, and 11.7 weight percent of plasticizer, and no lignin.

To a 400 milliliters glass container 76.125 grams of a polyester, derived from succinic acid and 1,3-propanediol (available as PSA 3000 available from Panolam Industries), and 10.875 grams of a different polyester, derived also from succinic acid, and 1,3-propanediol (available as PSA 2000 from Panolam Industries) were melted at 70° C. for 2 hours in an oven. To this were added 0.479 gram of TEGOSTAB® surfactant (available from Evonik), 4.350 grams of 1,3-propanediol (chain extender from DuPont), 0.392 gram of DABCO LV® catalyst (available from Evonik), 0.044 gram of deionised water, 6.090 grams of polysaccharide polymers (available from DuPont), 3.2 grams of orange dye (available from BAO Shen Polyurethane Tech. LTD-China) were added on top of the above melted polyol. The contents obtained were then mixed for 3 minutes at 1800 rpm to form a homogeneous dispersion A. To this were then added 18.3 grams of tributyl citrate (available from Jungbunzlauer as CITROFOL®) and mixed for 30 minutes to result in dispersion A. In a separate 400 milliliters glass container, 1.000 grams of AX 8009, available from Cabot, were added on top of 199.000 grams of a Diphenylmethane Diisocyanate (available from Huntsman as Rubinate 1680), and mixed for 2 minutes at 300 rpm. A portion of this mixture, 36.602 grams, was added to the above homogeneous dispersion A via a syringe. After the syringe was empty, the mixture resulting was stirred for a further 7 seconds, and 124.4 grams of the mixture were poured into a plaque mold which had a volume of 311 grams/centimeters$^3$ to result in a density of 0.4 gram/centimeters$^3$. The mold temperature was at 50° C. to 55° C., and the curing time was 30 minutes. After 48 hours at room temperature, each plaque was tested for mechanical properties after cutting into appropriate dog-bone shapes according to ASTM D3574 or "C" shape according to ASTM D624. The bio-based content of the polyurethane of this Example was 74 weight percent. The results are tabulated in Table 4.

Example 18

Preparation of a midsole plaque polyurethane foam derived from 55.6 weight percent of polyol, 23.4 weight percent of diisocyanate, 2.78 weight percent of chain extender, 2.05 weight percent of dye, 3.89 weight percent of polysaccharide, 0.25 weight percent of catalyst, 0.31 weight percent of surfactant, 11.7 weight percent of plasticizer, and an extract of from 0.55 weight percent of Kraft Lignin.

To a 400 milliliters glass container, 76.125 grams of a polyester, derived from succinic acid, and 1,3-propanediol (available as PSA 3000 available from Panolam Industries), and another 10.875 grams of a different polyester, derived also from succinic acid, and 1,3-propanediol (available as PSA 2000) were melted at 70° C. for 2 hours in an oven. 0.479 Gram of TEGOSTAB® surfactant (available from Evonik), 4.350 grams of 1,3-propanediol (chain extender from DuPont), 0.392 gram of DABCO LV® catalyst (available from Evonik), 0.044 gram of deionised water, 6.090 grams of polysaccharide polymers (available from DuPont), 3.202 grams of orange dye (available from BAO Shen Polyurethane Tech. LTD-China) were added on top of the melted polyol. The contents obtained were then mixed for 3 minutes at 1800 rpm to form a homogeneous dispersion A. In a 400 milliliters flask with a magnetic stirrer, 0.87 gram of lignin (available as Kraft Lignin from West Fraser Mill Ltd.) and 18.3 grams of tributyl citrate (available from Jungbunzlauer as CITROFOL®) were mixed for 30 minutes, and then filtered using a Whatman #1 filter paper. The filtrate was comprised of the CITROFOL® and lignin soluble material resulting in a uniform clear dispersion. The filtered lignin was discarded. The filtrate was added to the above homogeneous dispersion A. In a separate 400 milliliters glass container, 1.000 grams of AX 8009 available from Cabot were added on top of 199.000 grams of a Diphenylmethane Diisocyanate (available from Huntsman as Rubinate 1680), and mixed for 2 minutes at 300 rpm. A portion of this mixture, 36.602 grams, was added to the above homogeneous dispersion A via a syringe. After the syringe was empty, the mixture resulting was stirred for a further 7 seconds, and 124.4 grams of the mixture were poured into a plaque mold which had a volume of 311 gram/centimeters$^3$ resulting in a density of 0.4 gram/centimeters$^3$. The mold temperature was at 50° C. to 55° C., and the curing time was 30 minutes. After 48 hours at room temperature, about 25° C., each plaque was tested for mechanical properties after cutting into appropriate dog-bone shapes according to ASTM D3574 or "C" shape according to ASTM D624. The bio-based content of the polyurethane of this Example 18 was 74.2 weight percent. The results are tabulated in Table 4.

cutting into appropriate dog-bone shapes according to ASTM D3574 or "C" shape according to ASTM D624. The bio-based content of the polyurethane of this Example 19 was 74.4 weight percent. The results are tabulated in Table 4.

TABLE 4

Mechanical Properties of PU Plaques with Lignin Extract

| Examples | Lignin (wt %) | Density (g/cm³) | Hardness | Tensile Strength (MPa) | Elongation (%) | Die C Tear (N/mm) | Split Tear Strength (N/mm) | Resilience (%) |
|---|---|---|---|---|---|---|---|---|
| 17 | 0 | 0.40 | 43 | 1.52 | 379 | 8.68 | 2.32 | 35 |
| 18 | 0.55 | 0.40 | 43 | 2.16 | 415 | 11.48 | 2.79 | 34 |
| 19 | 1.50 | 0.40 | 44 | 1.83 | 342 | 11.98 | 2.78 | 33 |

Example 19

Preparation of a midsole plaque polyurethane foam derived from 54.8 weight percent of polyol, 23.0 weight percent of diisocyanate, 2.74 weight percent of chain extender, 2.05 weight percent of dye, 3.83 weight percent of polysaccharide, 0.25 weight percent of catalyst, 0.3 weight percent of surfactant, 11.5 weight percent of a composition comprised of plasticizer, and an extract of about 1.5 weight percent of Kraft Lignin.

To a 400 milliliters glass container, 76.125 grams of a polyester, derived from succinic acid, and 1,3-propanediol (available as PSA 3000 available from Panolam Industries), and another 10.875 grams of a different polyester, derived also from succinic acid, and 1,3-propanediol (available as PSA 2000) were melted at 70° C. for 2 hours in an oven. 0.479 Gram of TEGOSTAB® surfactant (available from Evonik), 4.350 grams of 1,3-propanediol (chain extender from DuPont), 0.392 gram of DABCO LV® catalyst (available from Evonik), 0.044 gram of deionised water, 6.090 grams of polysaccharide polymers (available from DuPont), 3.202 grams of orange dye (available from BAO Shen Polyurethane Tech. LTD-China) were added on top of the above melted polyol. The resulting composition was mixed for 3 minutes at 1800 rpm to form a homogeneous dispersion A. In a 400 milliliters flask with a magnetic stirrer, 2.38 grams of lignin (available as Kraft Lignin from West Fraser Mill Ltd) change to 18.3 grams of tributyl citrate (available from Jungbunzlauer as CITROFOL®) were mixed for 30 minutes, and then filtered using a Whatman #1 filter paper. The filtrate was comprised of the CITROFOL® and lignin soluble material of a uniform clear dispersion. The filtered insoluble lignin was discarded. The filtrate was then added to the above homogeneous dispersion A. In a separate 400 milliliters glass container, 1.000 grams of AX 8009 from Cabot were added on top of 199.000 grams of a Diphenylmethane Diisocyanate (available from Huntsman as Rubinate 1680), and mixed for 2 minutes at 300 rpm. A portion of this mixture, 36.602 grams, was added to the above homogeneous dispersion A via a syringe. After the syringe was empty, the mixture resulting was stirred for a further 7 seconds, and 124.4 grams of the mixture were poured into a plaque mold which had a volume of 311 gram/centimeters³ and with a density of 0.4 gram/centimeters³. The mold temperature was at 50° C. to 55° C., and the curing time was 30 minutes. After 48 hours at room temperature, about 25° C., each plaque was tested for mechanical properties after The results from Table 4 indicate that the midsole plaques of Examples 18 and 19, comprised of the plasticizer containing the lignin soluble extract, resulted in improvements in mechanical properties versus Comparative Example 17 without any lignin. Specifically, the use of the lignin containing composition provides an improved overall performance in tensile strength, die c tear, split tear strength, and similar performances in resilience and hardness.

Examples 20 to 22

Preparation of midsole plaque polyurethane foams, derived from 54.8 weight percent of polyol, 23.0 weight percent of diisocyanate, 2.74 weight percent of chain extender, 2.05 weight percent of dye, 3.83 weight percent of polysaccharide, 0.25 weight percent of catalyst, 0.3 weight percent of surfactant, 11.5 weight percent of plasticizer, and an extract of 1.5 percent by weight of Kraft lignin, at different temperatures.

To a 400 milliliters glass container, 76.125 grams of a polyester, derived from succinic acid and 1,3-propanediol (available as PSA 3000 available from Panolam Industries), and 10.875 grams of a different polyester, derived also from succinic acid and 1,3-propanediol (available as PSA 2000), were melted at 70° C. for 2 hours in an oven. 0.479 Grams of TEGOSTAB® surfactant (available from Evonik), 4.350 grams of 1,3-propanediol (chain extender from DuPont), 0.392 gram of DABCO LV® catalyst (available from Evonik), 0.044 gram of deionised water, 6.090 grams of polysaccharide (available from DuPont), 3.202 grams of orange dye (available from BAO Shen Polyurethane Tech. LTD-China) were added on top of the melted polyol. The composition contents resulting were mixed for 3 minutes at 1800 rpm to form a homogeneous dispersion A. In a 400 milliliters flask with a magnetic stirrer, 2.38 grams of lignin (available as Kraft Lignin from West Fraser Mill Ltd.) and 18.3 grams of tributyl citrate (available from Jungbunzlauer as CITROFOL®) were mixed for 30 minutes at various temperatures as listed in Table 5, and then filtered using a Whatman #1 filter paper. The filtrate was comprised of the CITROFOL® and lignin soluble material of a uniform clear dispersion. The filtered insoluble lignin was discarded. The filtrate was then added to the above homogeneous dispersion A. In a separate 400 milliliters glass container, 1.000 grams of AX 8009 from Cabot were added on top of 199.000 grams of a Diphenylmethane Diisocyanate (available from Huntsman as Rubinate 1680), and mixed for 2 minutes at 300 rpm. A portion of this mixture, 36.602 grams, was added to the above homogeneous dispersion A via a syringe. After the syringe was empty, the mixture resulting was stirred for a further 7 seconds, and 124.4 grams of the mixture were poured into a plaque mold which had a volume of 311 grams/centimeters$^3$ and a density of 0.4 gram/centimeters$^3$. The mold temperature was at 50° C. to 55° C. and the curing time of 30 minutes. After 48 hours at room temperature (25° C. throughout), each plaque was tested for mechanical properties after cutting into appropriate dog-bone shapes according to ASTM D3574 or "C" shape according to ASTM D624. The bio-based content of the polyurethane of these Examples was 74.4 percent. The results are tabulated in Table 5.

TABLE 5

Mechanical Properties of PU Plaques of Lignin Plasticizer Blend at Different Temperatures

| Examples | Lignin (wt %) | Temperature (° C.) | Density (g/cm$^3$) | Hardness | Tensile Strength (MPa) | Elongation (%) | Die C Tear (N/mm) | Split Tear Strength (N/mm) | Resilience (%) |
|---|---|---|---|---|---|---|---|---|---|
| 20 | 1.5 | 40 | 0.40 | 50 | 1.87 | 346 | 12.45 | 3.23 | 34 |
| 21 | 1.5 | 80 | 0.40 | 52 | 1.96 | 352 | 13.38 | 3.34 | 33 |
| 22 | 1.5 | 92 | 0.40 | 52 | 2.17 | 375 | 12.74 | 3.21 | 34 |

The results of Table 5 indicate that for Examples 20 to 22, wherein the lignin composition comprised of a plasticizer containing an extract of 0.75 percent by weight of soluble lignin at different temperatures of extraction results in improvement in mechanical properties versus Comparative Example 1 which contains no lignin extract. Furthermore, the mechanical properties are increased proportionally at higher temperatures of extraction. Specifically, higher temperature resulted in improved performance in hardness, die c tear, split tear strength, tensile strength and elongation.

The claims, as originally presented and as they may be amended, include alternatives, modifications, improvements, equivalents, and substantial equivalents of the disclosed embodiments and teachings, including those that are presently unforeseen, or unappreciated, and that, for example, may arise from applicants/patentees and others. Unless specifically recited in a claim, steps, or components of claims should not be implied, or imported from the specification, or any other claims as to any particular order, number, position, size, shape, angle, color, or material. Percent by weight or weight percent is a known quantity and is usually based on the total of the components present divided by the specific component present.

What is claimed is:

1. A polyurethane elastomer derived from components comprising (a) an organic diisocyanate, (b) a polyester resin, (c) a chain extender, (d) a foaming agent, (e) an optional crosslinker, (e) an optional colorant, (f) a surfactant, (g) a foaming agent, and (h) a lignin plasticizer composition comprised of a lignin and a plasticizer, wherein said lignin plasticizer composition is generated by:
   contacting and dispersing said lignin in said plasticizer,
   removing by filtration the bulk unextracted insoluble lignin solids, and
   isolating the remaining filtrate containing the plasticizer and a soluble portion of the lignin.

2. A polyurethane elastomer in accordance with claim 1 wherein said lignin is selected from the group consisting of at least one of a pal alkali lignin, a Kraft lignin, a Klason lignin, a hydrolytic lignin, an enzymic mild acidolysis lignin, an organosolv lignin, a steam explosion lignin, a milled wood lignin, a lignin sulfite, a lignin sulfate, ligno-sulfonates, and salts thereof containing at least one of Ca, Na, Mg, and K and Black Liquor, and said lignin plasticizer composition is comprised of a mixture of said plasticizer and soluble lignin.

3. A polyurethane elastomer in accordance with claim 1 wherein said lignin is a Kraft lignin.

4. A polyurethane elastomer in accordance with claim 1 wherein said plasticizer and soluble lignin are present in an amount of from about 0.1 percent by weight to about 50 percent by weight, and said colorant is present.

5. A polyurethane elastomer in accordance with claim 4 wherein said soluble lignin is present in an amount of from about 0.1 percent by weight to about 10 percent by weight.

6. A polyurethane elastomer in accordance with claim 1 wherein the soluble lignin is present in an amount of from about 0.1 percent by weight to about 10 percent by weight based on the amount of elastomer components.

7. A polyurethane elastomer in accordance with claim 1 wherein a bio-content of the polyurethane elastomer is from about 60 percent to about 90 percent, said crosslinker is present, said colorant is present, and further including a catalyst.

8. A polyurethane elastomer in accordance with claim 1 wherein contacting and dispersing said lignin in said plasticizer comprises contacting and dispersing said lignin in said plasticizer at a temperature of from about 25° C.

9. A polyurethane elastomer in accordance with claim 1 wherein said colorant is present, and is selected from the group consisting of a dye, a pigment and mixtures thereof present in an amount of from about 0.5 percent by weight to about 5 percent by weight, and said polyester is a semi-crystalline polyester selected from the group consisting of poly(1,3-propylene-succinate), and copoly(1,3-propylene-succinate)-copoly(1,2-propylene-succinate), wherein said foaming agent is carbon dioxide or water, and wherein the polyester is a semi-crystalline polyester with a melting point of from about 40° C. to about 50° C.

10. A polyurethane elastomer in accordance with claim 1 wherein said polyester is a crystalline polyester generated from the reaction of an organic diacid and an organic diol, wherein said organic diacid is selected from the group comprising succinic acid, adipic acid, sebacic acid, 1,12-dodecanedioic acid, a dimer diacid, and polymerized fatty acids; and said organic diol is selected from the group comprising 1,5-pentanediol, ethylene glycol, diethylene glycol, 1,3-propanediol, 1,2-propanediol, dipropylene glycol, 1,4-butanediol, 3-methyl-1,5-pentanediol, 1,6-hexanediol, 1,9-nonanediol, a dimer diol, and wherein said organic diol and said organic diacid are obtained from natural carbohydrates, biobased carbohydrates, or from the fermentation of carbohydrates.

11. A polyurethane elastomer in accordance with claim 1 wherein said organic diisocyanate is selected from the group consisting of diphenylmethane 4,4'-diisocyanate, isophorone diisocyanate, dicyclohexylmethane 4,4-diisocyanate, hexamethylene 1,6-diisocyanate, naphthalene 1,5-diisocyanate, and mixtures thereof, and further including a catalyst.

12. A polyurethane elastomer in accordance with claim 1 wherein said organic diisocyanate is methylenediphenyl diisocyanate, and wherein said polyester is a semi-crystalline polyester selected from the group consisting of poly(1,3-propylene-succinate) and copoly(1,3-propylene-succinate)-copoly(1,2-propylene-succinate).

13. A polyurethane elastomer in accordance with claim 1 wherein said plasticizer is selected from the group consisting of tributyl-citrate, an ester, triethyl-citrate; trimethyl-citrate, an adipate, alkyl aryl phthalates, and alkyl phthalates.

14. A polyurethane elastomer in accordance with claim 1 wherein said surfactant is selected from the group consisting of a silicone surfactant, sodium dodecylbenzene sulfonate, sodium dodecylnaphthalene sulfate, dialkyl benzenealkyl, adipic acid, polyvinyl alcohol, polyacrylic acid, methalose, methyl cellulose, and ethyl cellulose.

15. A polyurethane elastomer in accordance with claim 1 wherein said chain extender is selected from the group consisting of alkylene diols and alkylene glycols; said polyester is a semi-crystalline polyester selected from the group consisting of poly(1,3-propylene-succinate), and copoly(1,3-propylene-succinate)-copoly(1,2-propylene-succinate); said plasticizer is tributyl citrate; said crosslinker is present and is an amine; said foaming agent is water or carbon dioxide, and said colorant is present, and is comprised of a dye; and optionally wherein said lignin is a crosslinked phenolic polymer.

16. A polyurethane elastomer in accordance with claim 1 wherein said crosslinker is present and is selected from the group consisting of diethanolamine, glycerol, trimethylol propane, pentaerythritol, 1,2,4-butanetriol, thioglycolic acid, 2,6-dihydroxybenzoic acid, melamine, and mixtures thereof.

17. A process for the preparation of a polyurethane elastomer comprising mixing (a) an organic diisocyanate, (b) a polyester resin, (c) a chain extender, (d) an optional crosslinker, (e) a surfactant, (f) a foaming agent, and (g) a colorant; followed by mixing said (a), (b), (c), (d) when present, (e), (f) and (g), and a lignin plasticizer composition comprised of a plasticizer and a lignin and generated by:
   forming a dispersion by contacting and dispersing said lignin in said plasticizer,
   removing by filtration the bulk unextracted insoluble lignin solids, and
   isolating the remaining filtrate containing the plasticizer and a soluble portion of the lignin.

18. A process in accordance with claim 17 wherein said polyester is a semicrystalline polyester generated from the reaction of organic diacid and an organic diol, and said organic diacid is selected from the group comprising succinic acid, adipic acid, sebacic acid, 1,12-dodecanedioic acid, and a dimer diacid, polymerized fatty acids, and mixtures thereof; and said organic diol is selected from the group comprising 1,5-pentanediol ethylene glycol, diethylene glycol, 1,3-propanediol, 1,2-propanediol, dipropylene glycol, 1,4-butanediol, 3-methyl-1,5-pentanediol, 1,6 hexanediol, 1,9-nonanediol and a dimer diol; and optionally wherein said organic diol and said organic diacid are obtained from natural carbohydrates, biobased carbohydrates, or from the fermentation of carbohydrates, wherein said plasticizer is tributyl-citrate.

19. A process in accordance with claim 17 wherein said soluble portion of the lignin is present in an amount of from about 0.1 percent by weight to about 50 percent by weight based on the lignin amount, wherein said dispersion is maintained for a period of from about 30 minutes to about 100 minutes at a temperature of from about 25° C. to about 80° C.

20. A process in accordance with claim 17, wherein said soluble portion of the lignin is present in an amount of from about 0.1 percent by weight to about 10 percent by weight based on the amount of lignin.

* * * * *